(12) United States Patent
Liu et al.

(10) Patent No.: US 7,343,039 B2
(45) Date of Patent: Mar. 11, 2008

(54) SYSTEM AND PROCESS FOR GENERATING REPRESENTATIONS OF OBJECTS USING A DIRECTIONAL HISTOGRAM MODEL AND MATRIX DESCRIPTOR

(75) Inventors: Xinguo Liu, Beijing (CN); Sing Bing Kang, Redmond, WA (US); Heung-Yeung Shum, Beijing (CN)

(73) Assignee: Microsoft Corporation, Redmond, WA (US)

( * ) Notice: Subject to any disclaimer, the term of this patent is extended or adjusted under 35 U.S.C. 154(b) by 1030 days.

(21) Appl. No.: 10/660,819

(22) Filed: Sep. 9, 2003

(65) Prior Publication Data

US 2004/0252889 A1 Dec. 16, 2004

Related U.S. Application Data

(60) Provisional application No. 60/478,689, filed on Jun. 13, 2003.

(51) Int. Cl.
*G06K 9/00* (2006.01)

(52) U.S. Cl. .................. 382/170; 382/154; 382/190; 382/305; 382/295; 382/296; 345/424; 345/419; 345/427

(58) Field of Classification Search .............. 382/170, 382/168, 154, 190, 251, 285, 295, 296, 298, 382/305; 345/419, 424, 427, 653, 679; 358/453, 403
See application file for complete search history.

(56) References Cited

U.S. PATENT DOCUMENTS

| | | | | |
|---|---|---|---|---|
| 4,277,684 A | * | 7/1981 | Carson | 378/7 |
| 5,029,586 A | * | 7/1991 | Honda | 600/425 |
| 5,253,169 A | * | 10/1993 | Corby, Jr. | 600/431 |
| 5,299,133 A | * | 3/1994 | Kobsa et al. | 700/95 |
| 2001/0012330 A1 | * | 8/2001 | Ogura et al. | 378/95 |
| 2001/0051005 A1 | * | 12/2001 | Itagaki et al. | 382/250 |
| 2004/0091153 A1 | * | 5/2004 | Nakano et al. | 382/228 |
| 2005/0207630 A1 | * | 9/2005 | Chan et al. | 382/131 |
| 2006/0167355 A1 | * | 7/2006 | Rico et al. | 600/407 |

OTHER PUBLICATIONS

Ankerst, M., G. Kastenmuller, H.P. Kriegel, and T. Seidl, 3D shape histograms for similarity search and classification in spatial databases, *Advances in Spatial Databases, 6th International Symposium, SSD'99*, Hong Kong, China 1999, vol. 1651, pp. 207-228.

(Continued)

*Primary Examiner*—Matthew C. Bella
*Assistant Examiner*—Ali Bayat
(74) *Attorney, Agent, or Firm*—Lyon & Harr, LLP; Richard T. Lyon

(57) ABSTRACT

A system and process for determining the similarity in the shape of objects is presented that generates a novel shape representation called a directional histogram model. This shape representative captures the shape variations of an object with viewing direction, using thickness histograms. The resulting directional histogram model is substantially invariant to scaling and translation. A matrix descriptor can also be derived by applying the spherical harmonic transform to the directional histogram model. The resulting matrix descriptor is substantially invariant to not only scaling and translation, but rotation as well. The matrix descriptor is also robust with respect to local modification or noise, and able to readily distinguish objects with different global shapes. The typical applications of the directional histogram model and matrix descriptor include recognizing 3D solid shapes, measuring the similarity between different objects and shape similarity based object retrieval.

27 Claims, 16 Drawing Sheets

OTHER PUBLICATIONS

Berchtold, S., and H. Kriegel, S3: Similarity search in CAD database systems, *Proceedings of the 1997 ACM SIGMOD International Conference on Management of Data*, 1997, pp. 564-567.

Cyr, C.M. and B. B. Kimia, 3D object recognition using shape similarity-based aspect graph, *ICCV01*, 2001, pp. 254-261.

Funkhouser, T., P. Min, M. Kazhdan, J. Chen, A. Halderman, D. Dobkin, and D. Jacobs, A search engine for 3D models, *ACM Transactions on Graphics*, 2003.

Garland, M., and P. S. Heckbert, Surface simplification using quadratic error metrics, *Proceedings of the 24th Annual Conference on Computer Graphics and Interactive Techniques*, 1997, pp. 209-216.

Healy, D. M., D. N. Rockmore, and S. S. B. Moore, FFTs for the 2 sphere improvements and variations, *Technical Report PCSTR96292*, 1996.

Hilaga, M., Y. Shinagawa, T. Kohmura, and T. L. Kunii, Topology matching for fully automatic similarity estimation of 3D shapes, *Proceedings for the 28th Annual Conference on Computer Graphics and Interactive Techniques*, 2001, pp. 203-212.

Kazhdan, M., T. Funkhouser, and S. Rusinkiewicz, Rotation invariant spherical harmonic representation of 3D shape descriptors, *Eurographics Symposium on Geometry Processing*, 2003.

Kobbelt, L., S. Campagna, and H. Seidel, A general framework for mesh decimation, *Graphics Interface*, 1998, pp. 43-50.

Lindstrom, P., and G. Turk, Fast and memory efficient polygonal simplification, *IEEE Visualization*, 1998, pp. 279-286.

Ohbuchi, R., T. Otagiri, M. Ibato, and T. Takei, Shape similarity search of three dimensional models using parameterized statistics, *IEEE Proceedings of Pacific Graphics*, Oct. 2002, pp. 265-274.

Osada, R., T. Funkhouser, B. Chazelle, and D. Dobkin, Matching 3D models with shape distributions, *Shape Modeling International*, May 2001, pp. 154-166.

Suzuki, M. T., A web-based retrieval system for 3D polygonal models, *Joint 9th IFSA World Congress and 20th NAFIPS International Conference (IFSA/NAFIP2001)*, 2001, pp. 2271-2276.

Vranic, D. V. and D. Saupe, 3D shape descriptor based on 3D fourier transform, *Proceedings of the EURASIP Conference on Digital Sound Processing for Multimedia Communications and Services*, Sep. 2001, pp. 271-274.

Vranic, D. V. and D. Saupe, Description of 3D shape using a complex function on the sphere, *Proceedings of the IEEE International Conference on Multimedia and Expo (ICME 2002)*, Aug. 2002, pp. 177-180.

Vranic, D. V., D. Saupe, and J. Richter, Tools for 3D object retrieval: Karhunen-Loeve transform and spherical harmonics, *Proceedings of the IEEE 2001 Workshop Multimedia Signal Processing*, Oct. 2001, pp. 293-298.

* cited by examiner

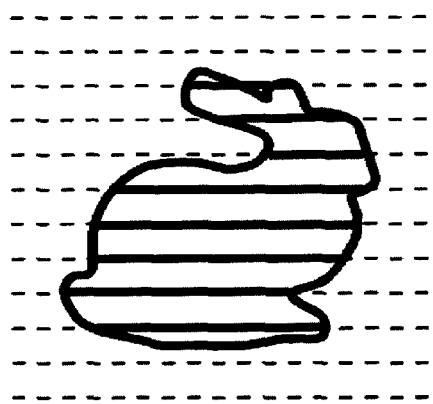 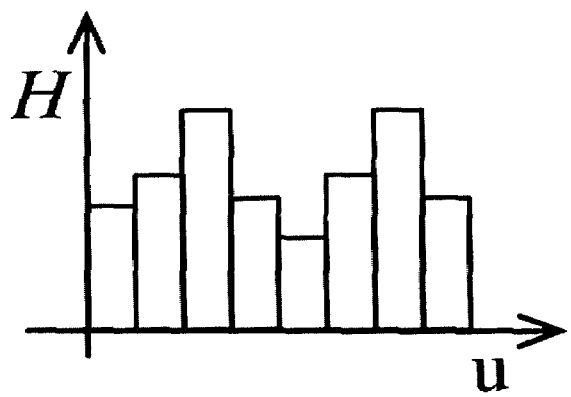
FIG. 7(a)  FIG. 7(b)
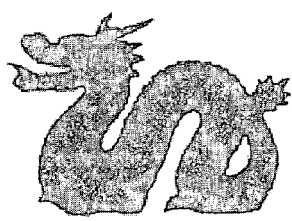 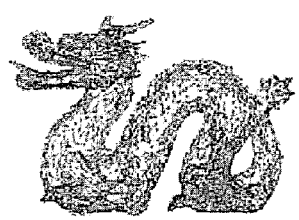 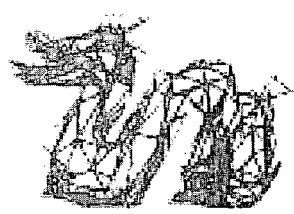
FIG. 9(a)   FIG. 9(b)   FIG. 9(c)

TABLE 1

| $N_s = 16$ | 10° | 20° | 30° | 40° | 50° |
|---|---|---|---|---|---|
| ball | 0.001 | 0.002 | 0.004 | 0.003 | 0.003 |
| venus | 0.002 | 0.015 | 0.013 | 0.013 | 0.013 |
| bunny | 0.002 | 0.003 | 0.004 | 0.005 | 0.007 |
| horse | 0.031 | 0.043 | 0.043 | 0.039 | 0.035 |
| bull | 0.007 | 0.006 | 0.012 | 0.019 | 0.018 |
| $N_s = 64$ | 10° | 20° | 30° | 40° | 50° |
| ball | 0.001 | 0.001 | 0.002 | 0.001 | 0.001 |
| venus | 0.004 | 0.005 | 0.005 | 0.004 | 0.003 |
| bunny | 0.011 | 0.015 | 0.014 | 0.007 | 0.007 |
| horse | 0.016 | 0.021 | 0.021 | 0.013 | 0.013 |
| bull | 0.011 | 0.013 | 0.014 | 0.009 | 0.009 |

FIG. 12

TABLE 2

|  | ball | venus | bunny | horse | bull |
|---|---|---|---|---|---|
| ball | 0.000 | 0.353 | 0.780 | 1.029 | 1.049 |
| venus | 0.353 | 0.000 | 0.525 | 0.831 | 0.846 |
| bunny | 0.780 | 0.525 | 0.000 | 0.434 | 0.449 |
| horse | 1.0289 | 0.8311 | 0.4341 | 0.0000 | 0.352 |
| bull | 1.049 | 0.846 | 0.449 | 0.352 | 0.000 |

FIG. 14

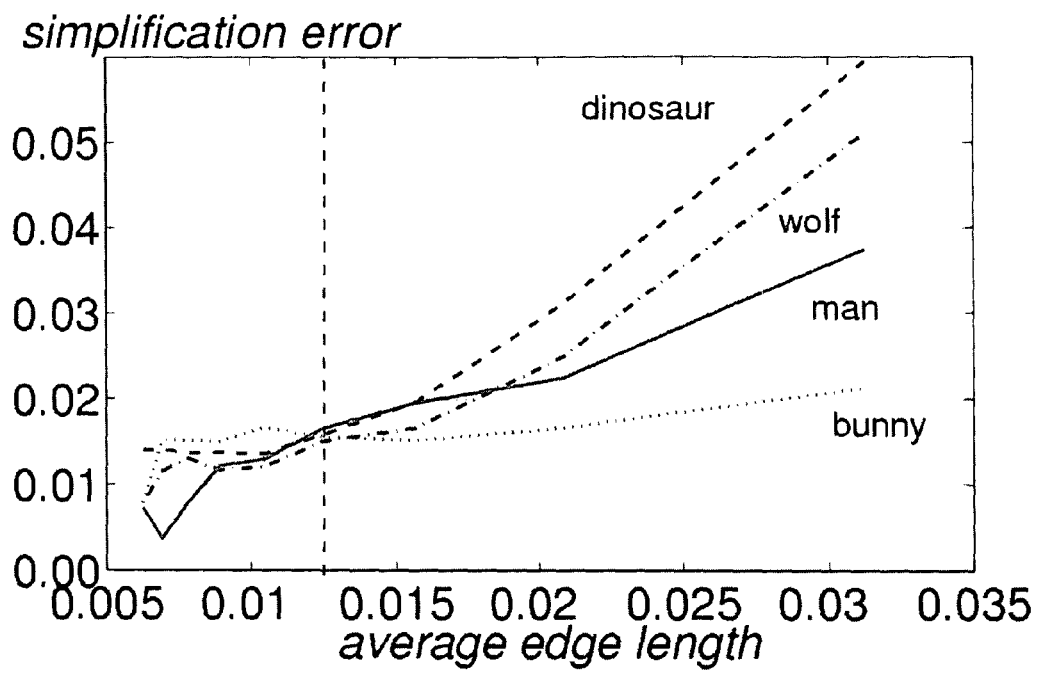
FIG. 13
FIG. 15(a)    FIG. 15(b)    FIG. 15(c)    FIG. 15(d)
            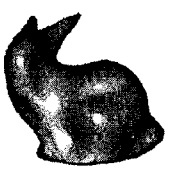
(a) 0.00    (b) 0.085    (c) 0.112    (d) 0.189
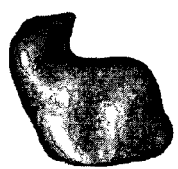    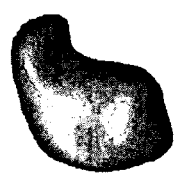    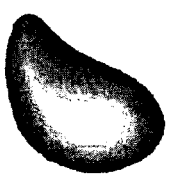    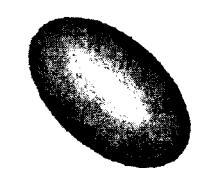
(e) 0.321    (f) 0.419    (g) 0.570    (h) 0.781
FIG. 15(e)    FIG. 15(f)    FIG. 15(g)    FIG. 15(h)

SYSTEM AND PROCESS FOR GENERATING REPRESENTATIONS OF OBJECTS USING A DIRECTIONAL HISTOGRAM MODEL AND MATRIX DESCRIPTOR

CROSS-REFERENCE TO RELATED APPLICATIONS

This application claims the benefit of a previously-filed provisional patent application Ser. No. 60/478,689 filed on Jun. 13, 2003.

BACKGROUND

1. Technical Field

The invention is related to generating a representation of an object, and more particularly to a system and process for generating representations of objects that are substantially invariant in regard to translation, scale and optionally rotation.

2. Background Art

In recent years, computer vision and graphics research has witnessed an increasing need for the ability to compare three dimensional objects. Most of the early object recognition techniques focused on comparing the 2D images of unknown objects with stored views of known objects. Progress in 3D object model acquisition techniques such as laser range finders and real-time stereo machines led to the problem of comparing 3D object models created using range images or 3D view-independent geometry. Object comparison is a key technique in applications such as shape similarity based 3D object retrieval, matching, recognition and categorization [2, 4, 10], which will be increasingly required as 3D modeling becomes more and more popular.

Comparison between 3D objects is usually based on object representations. Typically, a 3D object is represented by a geometric model, appearance attributes, and/or optionally annotations. The geometric model represents the shape of a 3D object, which is the central part for object representation. These models are usually obtained via 3D sensors, Computer Aided Design (CAD), stereo or shape-from-X techniques. There are many specific representations for geometric models, such as boundary representation, voxel representation, Constructive Solid Geometry (CSG) tree, point cloud, range image and implicit functions. The aforementioned appearance attributes include color, texture and Bidirectional Reflectance Distribution Functions (BRDFs), which are of interest for image synthesis in computer graphics and rendering based vision applications. As for annotations, these include other attributes describing an object at a semantic level and provide an efficient and effective way to retrieve objects from a 3D database. For example, a car model can be easily retrieved using the keyword "car", if such an annotation is provided a priori. However, it is not reasonable to assume that all objects in the database have such annotations, since some objects in a 3D database may not have been annotated when they were created, and it is extremely difficult to automatically annotate 3D objects. In addition, manual labeling is very laborious if the database is large.

The appearance of a 3D object provides a large amount of information for human perception, but it is very difficult to incorporate appearance in object comparison techniques. The current research on comparing 3D objects is focused on comparing their shapes. However, the geometric model for the shape in current 3D object representation schemes is usually developed for specific tasks such as modeling, editing and rendering, and is not well suited for comparison purposes. Firstly, there are many types of geometric representations, and it is difficult to compare the geometric models created with different representations without some form of conversion. Second, the geometric representation for the 3D shape is usually not invariant to scaling or rigid transformations. For example, the same shape may be represented differently in two coordinated systems. Therefore, a shape descriptor is usually extracted from the geometry model, and used for object comparison. Ideally, these descriptors should be scale and rigid transform invariant, capable of good discriminability, robust to noise, and independent of specific geometric representations. Current descriptors do not completely achieve these goals.

Previous work related to shape similarity can be found mainly in three research areas: (1) object recognition and classification, (2) surface matching and alignment, and (3) 3D shape comparison and shape similarity based object retrieval. The task of object recognition and classification is to determine whether a shape is a known object and to find k representative objects in an object data set. Existing object recognition approaches are typically based on analyzing 2D images of an object captured at different viewpoints. The task of surface matching and alignment is to find overlapping regions between two 3D objects. The representative work in this area includes range image based approaches, ICP (Iterative Closest Point) based approaches, spin images, geometric hashing and structural indexing. The aforementioned 3D shape comparison approach is related to surface matching, but it focuses on comparing the object's global shape, while surface matching compares only part of the object's shape. By building a map from the 3D shape onto a sphere, some approaches generate spherical representations for the shapes, and then compare them to a database of spherical representations. Since the map from the shape to the sphere is independent of translation and scaling, comparison between two 3D objects can be accomplished by finding the rotation that minimizes the difference between their spherical representations. However, there are issues with occlusion, and these representations require explicit orientation alignment.

View-based approaches [3] use 2D views of a 3D object for object recognition. Given an unknown object, views at random angles are generated, and matched against the prototypical views in a database. The best match gives the identity of an unknown object and optionally its pose. However, such techniques tend to require large databases and memory footprints, and recognition rates tend to be slow.

There is a movement towards placing more emphasis on fast recognition rates, due to the potential of a 3D search engine. This requires shape representations that are not only fast to extract, but efficient to compare against similar representations of other objects. Examples include the multiresolutional Reeb graph (MRG) [7], shape distribution [11], shape histogram [1], ray-based descriptors [15, 14], groups of features [12], aspect graph [3], parameterized statistics [10], and 3D FFT based descriptors [13].

The representation of MRG [7] provides a fully automatic similarity estimation of 3D shapes by matching the topology. The topology information is analyzed based on the integrated geodesic distance, so the topology matching approach is pose invariant. However, the topology matching is difficult to accelerate, which will be a problem when retrieving objects from a large database.

Shape distribution techniques give a very simple description for 3D shape, which has advantages in 3D object retrieval since it is easy to compute and efficient to compare. Osada et al. [11] proposed the use of the D2 shape distribution, which is a histogram of distance between points on the shape surface.

Ankerst et al. [1] and Vranic et al. [15] proposed the use of feature vectors based on spherical harmonic analysis. However, their spherical functions are sensitive to the location of the shape centroid, which may change as a result of shape outliers or noise.

It is noted that in the preceding paragraphs, as well as in the remainder of this specification, the description refers to various individual publications identified by a numeric designator contained within a pair of brackets. For example, such a reference may be identified by reciting, "reference [1]" or simply "[1]". Multiple references will be identified by a pair of brackets containing more than one designator, for example, [2, 3]. A listing of references including the publications corresponding to each designator can be found at the end of the Detailed Description section.

SUMMARY

The present invention is directed toward a system and process for creating a shape representation model of shapes that overcomes the foregoing shortcomings of current approaches. In general, the present object representation technique captures the shape variation of an object and is substantially invariant to scaling and arbitrary rigid transforms. This shape representation or descriptor, called a matrix descriptor, is derived from a novel directional histogram model. The directional histogram model is computed by first extracting directional distribution of thickness histogram signatures, which are translation and scale invariant. The extraction process producing the thickness histogram distribution can be accelerated using a standard graphics accelerator. The matrix descriptor is then generated by computing the spherical harmonic transform of the directional histogram model to achieve orientation invariance. Extensive experiments show that the foregoing shape representation is capable of high discrimination power and is robust to noise.

The matrix descriptor is advantageous in many aspects. First, it is easy to compute, and economical to store in memory. Second, it is substantially invariant to changes in rotation, translation, and scaling, and it is applicable to many kinds of objects. Thirdly, it is stable against reasonable amounts of noise. In addition, it is expressive in that it readily distinguishes objects with different global shapes.

Typical applications of the matrix descriptor include recognizing 3D solid shapes, measuring the similarity between different objects and shape similarity based object retrieval. Further, the capability to judge the similarity of 3D shapes is not only very important for object classification and recognition, but also very important for developing 3D search engine for local databases, or the Internet. The present invention gives a robust and easy-to-compute measurement to judge the similarity of 3D shapes, and so is ideally suited for use in these applications.

The foregoing is generally accomplished by generating a representation of an object as follows. First, for a prescribed number of directions, the thickness of the object for each of a prescribed number of parallel rays directed through the object along the direction under consideration is determined. The resulting thickness values are then normalized so that the resulting maximum thickness is one. The normalized thickness values can then be uniformly quantized to reduce the processing load. Next, the values are binned to generate the thickness histogram. The thickness histogram is subsequently rescaled (i.e., normalized) so that the sum of squares of its bins is one. It is the thickness histograms associated with the prescribed directions that define the aforementioned directional histogram model of the object. This model could be used as the representation of the object as it is substantially invariant to translation and scaling. However, the model could be further characterized as a number of spherical functions defined on a unit sphere which are subjected to a spherical harmonic transform to produce the aforementioned matrix descriptor. Using this descriptor to represent an object has the added advantage of being substantially invariant to rotation (i.e., orientation), in addition to translation and scaling.

In general, determining the thickness of the object as transected by one of the parallel rays involves identifying the 3D coordinates of the nearest point of intersection of the ray with the object as well as the 3D coordinates of the furthest point of intersection. The distance between these coordinates is then computed. This distance represents the thickness of the object as transected by the ray. In one embodiment of the present invention, the foregoing procedure is accomplished using a 3D graphics accelerator and a geometric model of the object. More particularly, the thickness of the object for a particular ray is computed by rendering an image of the front of the object using a 3D graphics accelerator and reading the depth value corresponding to each pixel of the object's front. Similarly, an image of the back of the object is rendered using the graphics accelerator and its depth values are read. Then, the distance between the depth values associated with a pair of corresponding pixels for each pair of corresponding pixels of the rendered images is computed, where this computed distance represents the thickness of the object as would be transected by a parallel ray directed through the corresponding pixels from the direction under consideration.

The object representation can be used in a variety of applications requiring that the similarity between objects be measured, such as 3D shape recognition, shape similarity based object retrieval systems, and 3D search engines. Typically the applications involve finding objects in a database that are similar to a sample object. In the context of the present 3D object representation technique, this is accomplished as follows. First, a database is created where objects are characterized as the aforementioned matrix descriptors. The geometric model of a sample object is then input and a matrix descriptor representation of the object is generated as described above. The matrix descriptor of the sample object is compared with each of the matrix descriptors in the database, and a distance measurement for each comparison is computed. This distance measurement is indicative of the degree of similarity there is between the matrix descriptors of the compared pair. Next, either a prescribed number of the objects characterized in the database that are associated with the lowest distance measurements or whose associated difference measurement falls below a maximum difference threshold are identified. The identified objects are then designated as being similar to the sample object.

In some applications there is no database and it is simply desired to access the similarity between 3D objects. This can be accomplished two objects at a time by simply ascertaining whether the aforementioned difference measurements computed for two objects falls below a difference threshold. If so, the objects are deemed to be similar to each other.

DESCRIPTION OF THE DRAWINGS

The specific features, aspects, and advantages of the present invention will become better understood with regard to the following description, appended claims, and accompanying drawings where:

FIGS. 7(a) and 7(b) illustrate the sampling geometry employed to calculate a thickness histogram in one sampling direction. In FIG. 7(a), a group of exemplary parallel rays is shown which traverse a shape (i.e., a rabbit). FIG. 7(b) is an example histogram representing a possible thickness distribution for the sampling of the shape shown in FIG. 7(a).

In FIG. 8(a) the execution time is plotted against the sample rate at a window size of 128 by 128. In FIG. 8(b) the execution time is plotted against the window size at a sampling rate of 64.

FIGS. 9(a)-(c) are diagrams showing three versions of a 3D mesh model of a dragon, where the diagram of FIG. 9(a) is the most complex and contains the most number of vertices, and the versions shown in FIGS. 9(b) and 9(c) are progressively less complex.

FIG. 12 is a table (i.e., Table 1) summarizing the variances in the matrix descriptor introduced by rotation for two different sampling rates.

FIG. 13 is a graph summarizing the error in the matrix descriptor introduced by simplification of an object's geometric model.

FIG. 14 is a table (i.e., Table 2) summarizing shape comparison results using a sampling rate of 16 and a window size of 128 by 128.

FIGS. 15(a)-(h) shows a series of shape similarity results between interpolated objects. In FIG. 15(a) the original object is shown, while FIGS. 15(b)-(g) represent interpolated objects between the objects of FIG. 15(a) and the simple ovoid blob object of FIG. 15(h). The number under each object is indicative of the degree of difference between the object and the original object.

DETAILED DESCRIPTION OF THE PREFERRED EMBODIMENTS

In the following description of the preferred embodiments of the present invention, reference is made to the accompanying drawings which form a part hereof, and in which is shown by way of illustration specific embodiments in which the invention may be practiced. It is understood that other embodiments may be utilized and structural changes may be made without departing from the scope of the present invention.

1.0 The Computing Environment

Figure 1:
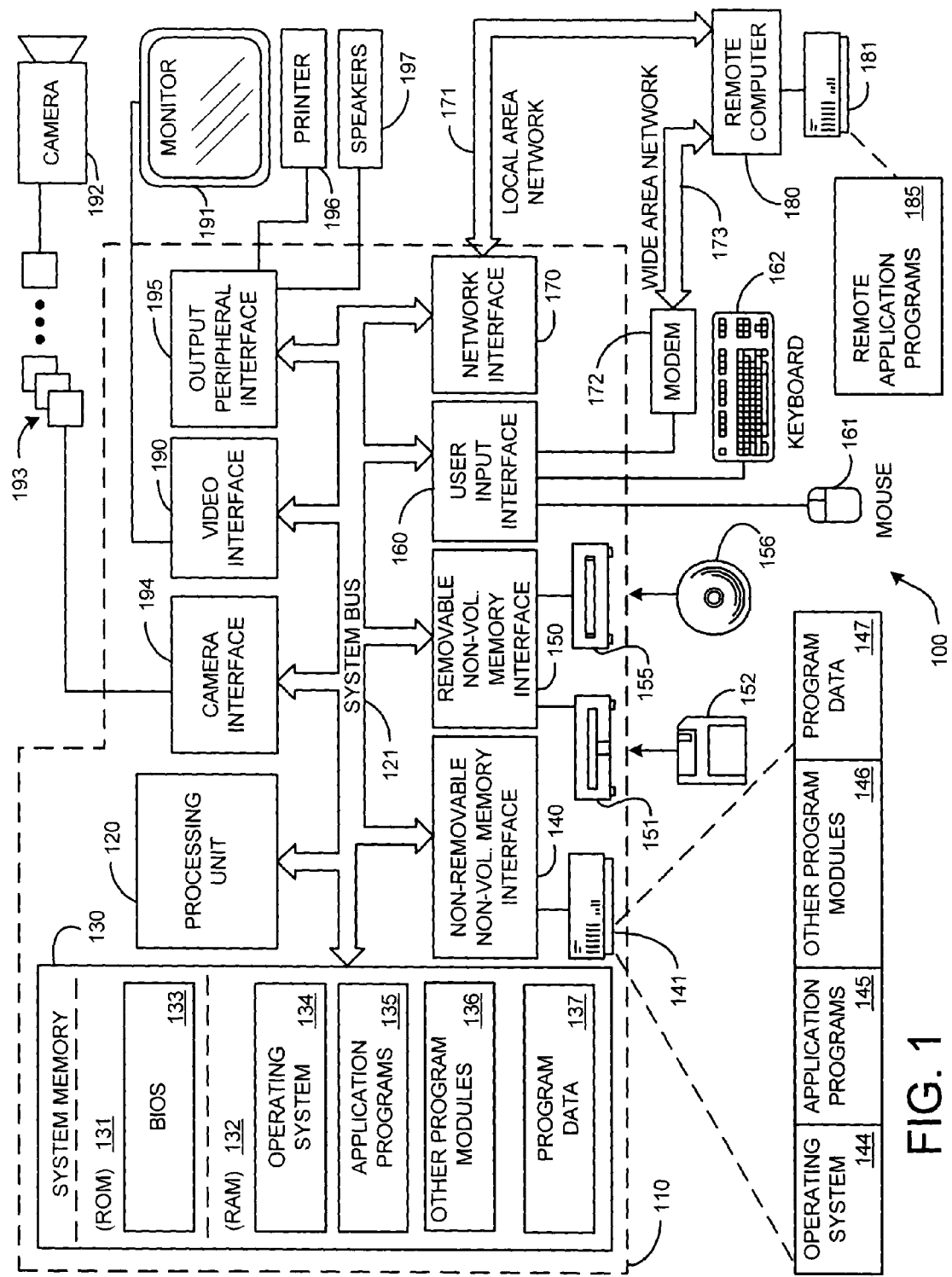
FIG. 1 is a diagram depicting a general purpose computing device constituting an exemplary system for implementing the present invention.

Before providing a description of the preferred embodiments of the present invention, a brief, general description of a suitable computing environment in which the invention may be implemented will be described. FIG. 1 illustrates an example of a suitable computing system environment 100. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, handheld or laptop devices, multiprocessor systems, microprocessor based systems, set top boxes, programmable consumer electronics, network PCs, minicomputers, mainframe computers, distributed computing environments that include any of the above systems or devices, and the like.

The invention may be described in the general context of computer executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and nonremovable media. By way of example, and not limitation, computer readable media may comprise computer storage media and communication media. Computer storage media includes both volatile and nonvolatile, removable and nonremovable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during startup, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/nonremovable, volatile/nonvolatile computer storage media. By way of example only, FIG. 1 illustrates a hard disk drive 141 that reads from or writes to nonremovable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195. Of particular significance to the present invention, a camera 163 (such as a digital/electronic still or video camera, or film/photographic scanner) capable of capturing a sequence of images 164 can also be included as an input device to the personal computer 110. Further, while just one camera is depicted, multiple cameras could be included as input devices to the personal computer 110. The images 164 from the one or more cameras are input into the computer 110 via an appropriate camera interface 165. This interface 165 is connected to the system bus 121, thereby allowing the images to be routed to and stored in the RAM 132, or one of the other data storage devices associated with the computer 110. However, it is noted that image data can be input into the computer 110 from any of the aforementioned computer readable media as well, without requiring the use of the camera 163.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

2.0 3D Object Shape Representation

The exemplary operating environment having now been discussed, the remaining part of this description section will be devoted to a description of the program modules embodying the invention. Generally, the system and process according to the present invention first involves generating a directional histogram model to study the shape similarity problem of 3D objects. This novel representation is based on the depth variations with viewing direction. More particularly, in each viewing direction, a histogram of object thickness values is built to create a directional histogram model. This model is substantially invariant to translation, scaling and origin-symmetric transform, since the histograms are obtained in such a way that they are independent of the location of the object and the scale of the object. In order to also make the 3D object representation substantially orientation invariant as well, a new shape descriptor having a matrix form, called matrix descriptor, is computed from the directional histogram model by computing the spherical harmonic transform of the model.

Figure 2A:
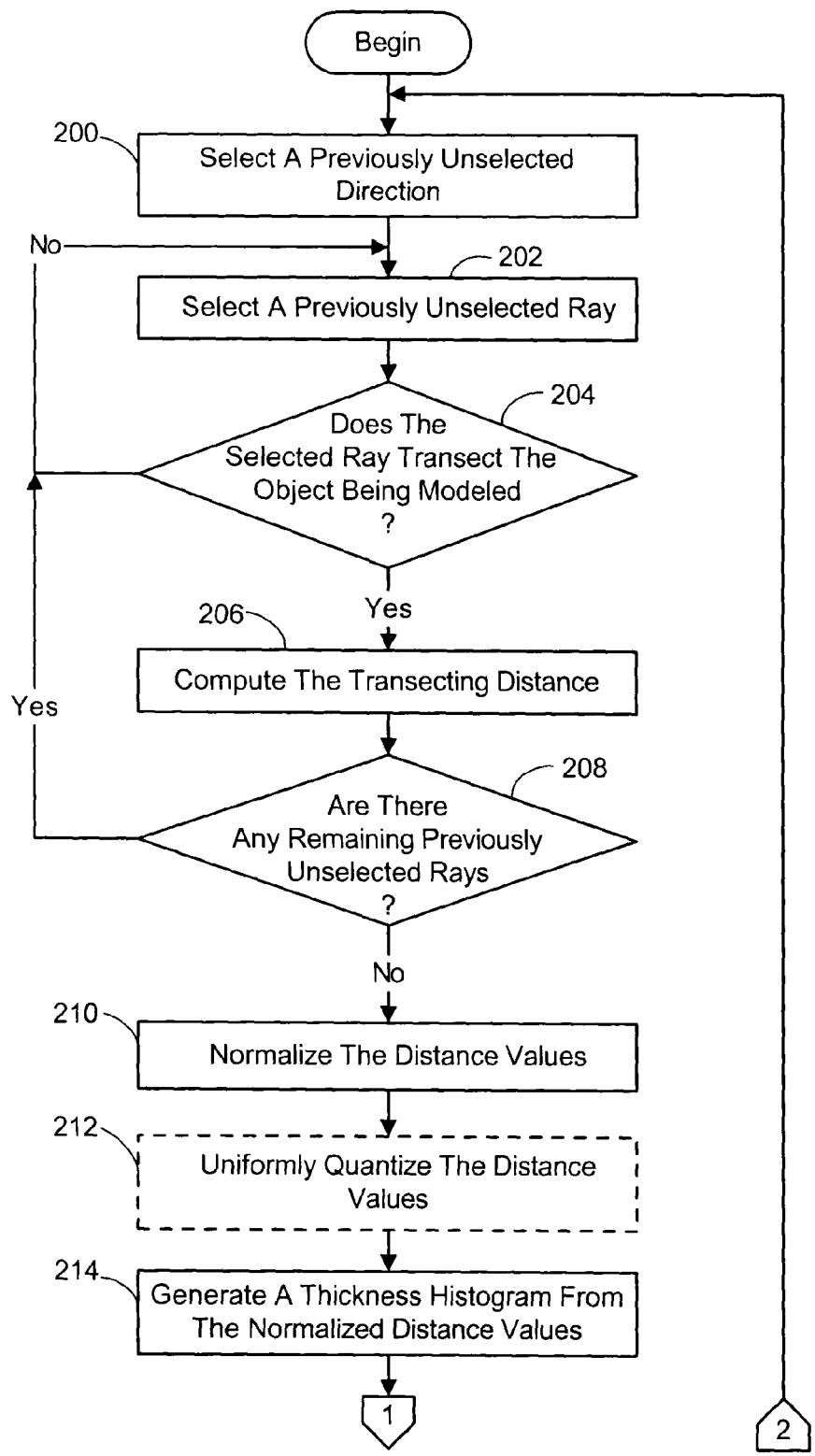
FIGS. 2A and 2B are a flow chart diagramming an overall process for generating a representation of an object in accordance with the present invention.
Figure 2B:
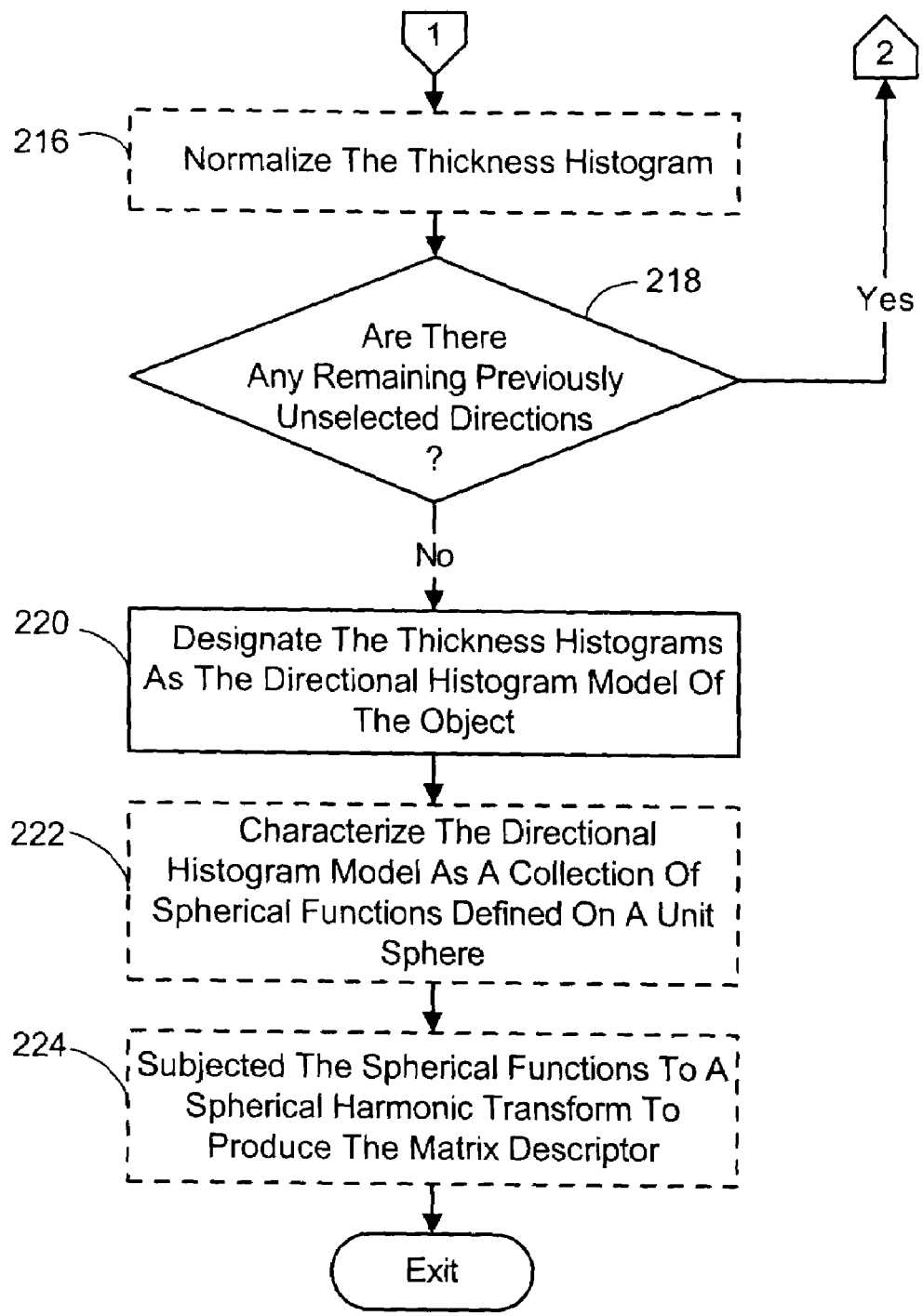

The foregoing is generally accomplished by generating a representation of an object as follows. First, for a prescribed number of directions, the thickness of the object for each of a prescribed number of parallel rays directed through the object along the direction under consideration is determined. Thus, referring to FIGS. 2A and 2B, a previously unselected one of the prescribed directions is selected (process action 200). Then, a previously unselected one of the parallel rays associated with the selected direction is selected (process action 202). It is next determined if the selected ray transects the object being modeled (process action 204). If not, process actions 202 and 204 are repeated to assess the status of another ray. If, however, the selected ray does transect the object, then in process action 206, the transecting distance (i.e., the thickness) is computed. It is next determined in process action 208 if there are any remaining rays that have not yet been considered. If there are such unconsidered rays, then process actions 202 through 208 are repeated. Once all the rays have been considered, the resulting distance or thickness values are normalized such that the maximum thickness is one (process action 210), and can then be uniformly quantized (optional process action 212). A thickness histogram is then generated in process action 214 from the normalized values through the process of banning. Next, this thickness histogram can be rescaled (i.e., normalized) such that the sum of squares of its bins is one (optional process action 216). Once the thickness histogram has been rescaled, it is determined if all the prescribed directions have been considered (process action 218). If not, then process actions 200 through 218 are repeated to generate additional thickness histograms. When all the directions have been considered, the thickness histograms associated with the prescribed directions are collectively designated as the aforementioned directional histogram model of the object (process action 220).

The directional histogram model could be used as the representation of the object as it is substantially invariant to translation and scaling. However, the model could be further characterized as a number of spherical functions defined on a unit sphere (optional process action 222), which are subjected to a spherical harmonic transform to produce the aforementioned matrix descriptor (optional process action 224). Using this descriptor to represent an object has the added advantage of being substantially invariant to rotation (i.e., orientation), in addition to translation and scaling. It is noted that the optional nature of the last two actions, as well as actions 212 and 216, is indicated by the dashed line boxes in FIGS. 2A and 2B.

The foregoing object representation can be used in a variety of applications requiring the measurement of the similarity between 3D objects. For example, these applications include 3D shape recognition, shape similarity based object retrieval systems, and 3D search engines. Often the applications involve finding objects in a database that are similar to a sample object. In the context of the present 3D object representation technique, this can be accomplished as follows.

Figure 3:
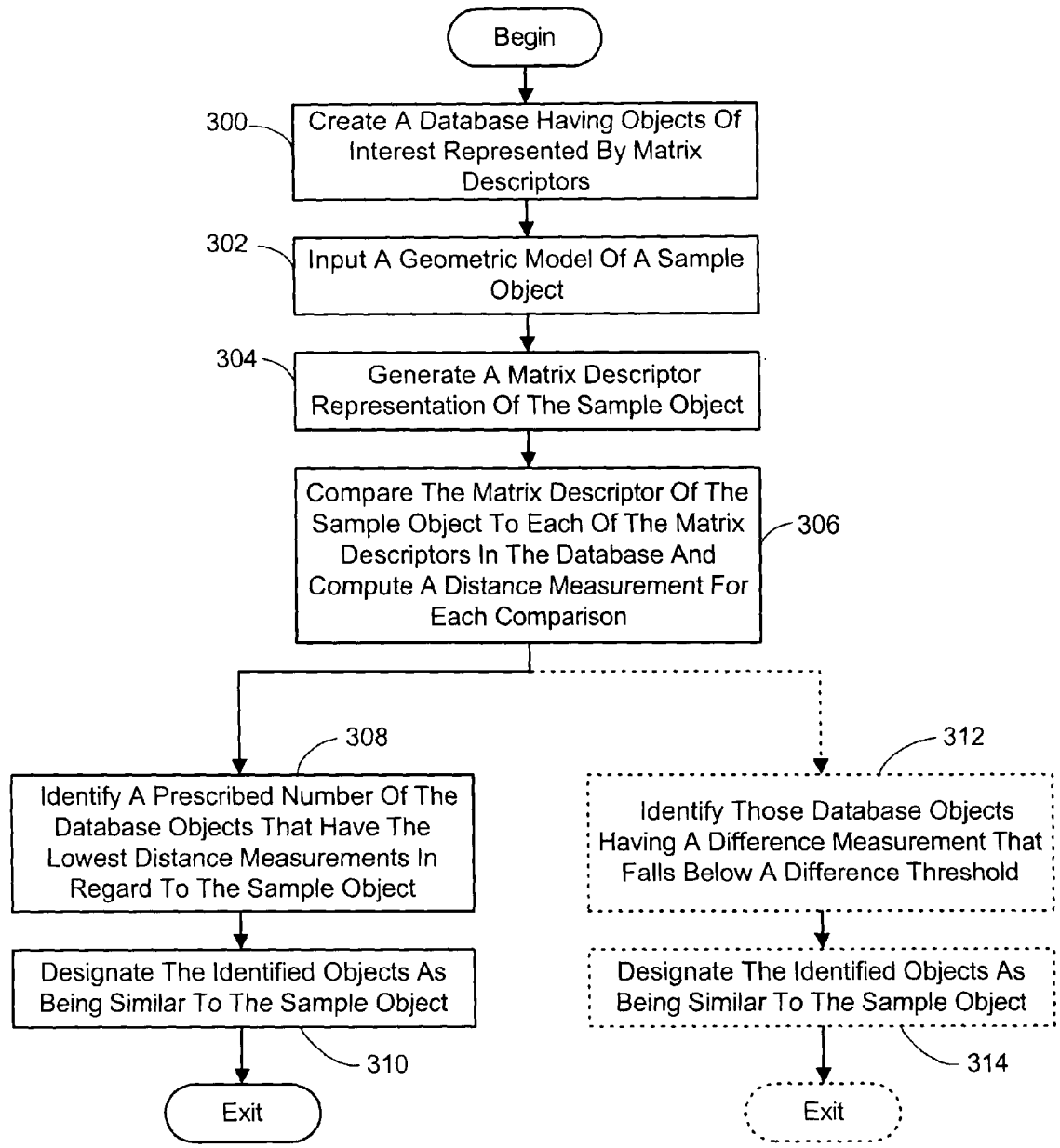
FIG. 3 is a flow chart diagramming a process for measuring the similarity of an object, which has been characterized using the representation generated via the process of FIGS. 2A and B, with a database of similarly characterized objects.

Referring to FIG. 3, a database is first created where objects of interest are characterized as the aforementioned matrix descriptors (process action 300). The geometric model of a sample object is then input (process action 302) and a matrix descriptor representation of the object is generated (process action 304) as described above. The matrix descriptor of the sample object is compared with each of the matrix descriptors in the database, and a distance measurement for each comparison is computed (process action 306). This distance measurement is indicative of the degree of similarity there is between the matrix descriptors of the compared pair and will be described in more detail later. Next, a prescribed number of the objects characterized in the database that are associated with the lowest distance measurements are identified (process action 308). The identified objects are then designated as being similar to the sample object (process action 310).

Alternately, in lieu of performing actions 308 and 310, the following actions can be performed. Namely, those objects characterized in the database whose associated difference measurement falls below a difference threshold are identified (alternate process action 312). These objects are then designated as being similar to the sample object (alternate process action 314). The alternate nature of the last two actions is indicated in FIG. 3 by the dotted line boxes.

Figure 4:
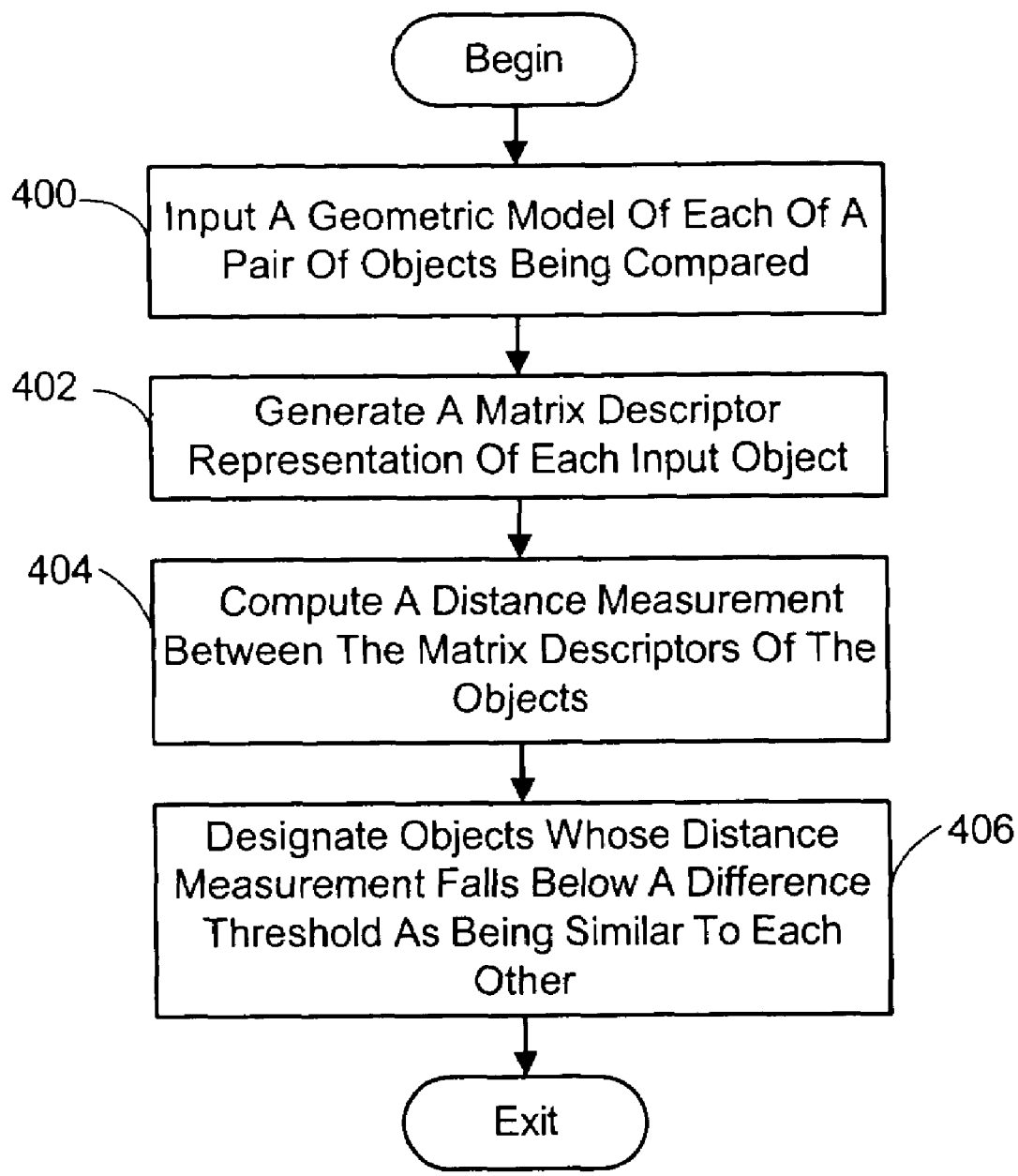
FIG. 4 is a flow chart diagramming a process for measuring the similarity between objects that have been characterized using the representation generated via the process of FIGS. 2A and B.

In some applications there is no database and it is simply desired to access the similarity of a pair of 3D objects. This can be accomplished as outlined in FIG. 4. First, a geometric model of each of the 3D objects being compared is input (process action 400). A matrix descriptor representation of each object is then generated (process action 402) in the manner described previously. The matrix descriptors of the objects are compared to each other, and a distance measurement is computed between them (process action 404). As before, this distance measurement is indicative of the degree of similarity there is between the matrix descriptors of the compared pair. Objects whose associated difference measurement falls below a difference threshold are designated as being similar to each other (process action 406).

The following sections will now describe the foregoing 3D object representation technique in more detail.

2.1 Directional Histogram Model

This section will describe the directional histogram model for 3D shapes. The goal of the directional histogram model is to develop an invariant and expressive representation suited for 3D shape similarity estimation.

To construct the directional histogram model, a distribution of sampling directions is chosen. For each sampling direction, a histogram of object extent or thickness is computed using parallel rays. For each ray, the thickness is defined as the distance between the nearest and farthest points of intersection with the object surface. The directional histogram model can be represented by a 3-D function $H(\theta, \phi, \mu)$: $[0,\pi] \times [0, 2\pi] \times [0,1] \mapsto R$, where $\theta,\phi$ are the angular parameters for direction. For each $(\theta,\phi)$, the direction vector is $(\cos \phi \sin \theta, \sin \phi \sin \theta, \cos \theta)$, and $H_{\theta,\phi}(\mu) \equiv H(\theta,\phi,\mu)$ is the thickness distribution of the object viewed from the direction $(\theta, 100)$. Note that each thickness histogram is also normalized with respect to the thickest value to ensure scale invariance. In tested embodiments of the present inventions, the sampling directions were computed as, $$\left\{(\theta_i, \phi_j) | \theta_i = (i+0.5)\frac{\pi}{N_s}, \phi_j = (j+0.5)\frac{2\pi}{N_s}, 0 \leq i, j < N_s\right\}, \quad (1)$$

where $N_s$ (an integer greater than zero) is the sampling rate. Since two opposing sampling directions will produce the same thickness values, the directional histogram model is symmetric about the origin, i.e., $$H_k(\theta,\phi) = H_k(-\theta+\pi,\phi+\pi) \quad (2)$$

This is referred to as being origin-symmetric.

Figure 5A:
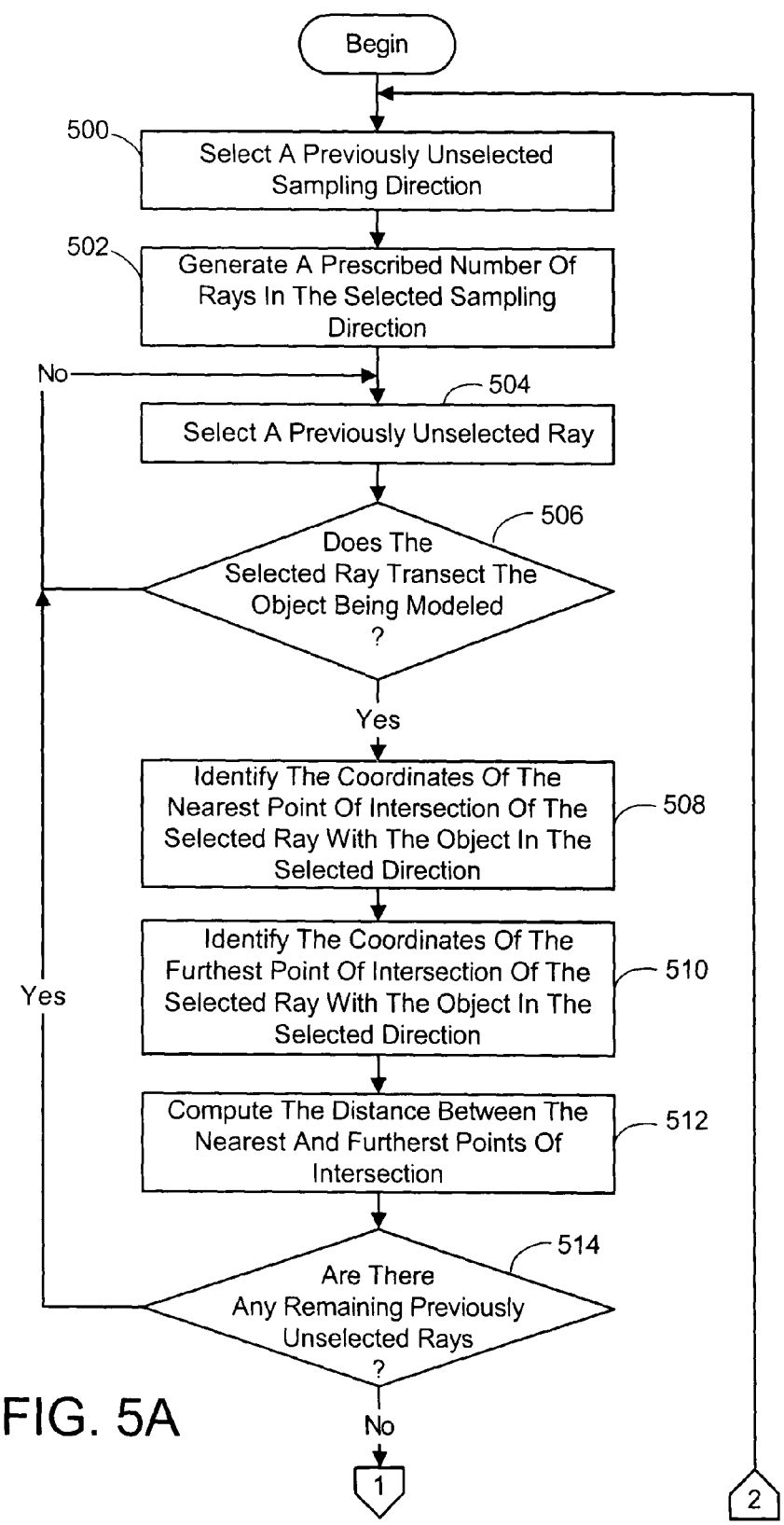
FIGS. 5A and 5B are a flow chart diagramming one embodiment of a process for generating a directional histogram model of an object as part of the process of FIGS. 2A and B.
Figure 5B:
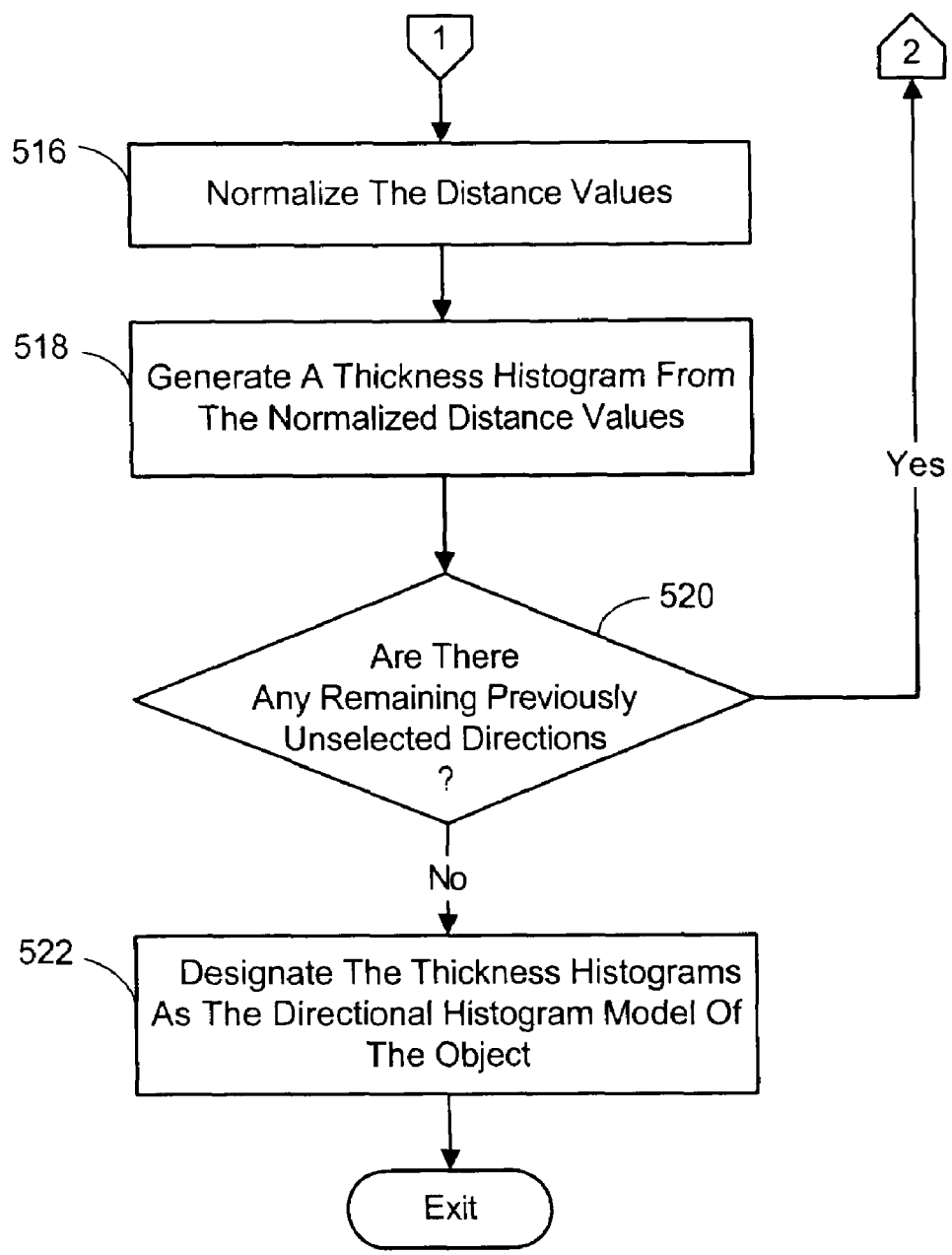

More particularly, one way of generating a directional histogram Model is as follows. Referring to FIGS. 5A and 5B, a previously unselected sampling direction $(\theta,\phi)$ is selected (process action 500). A prescribed number of rays in the selected sampling direction are then generated (process action 502). A ray is a line in space of infinite length. For a given direction computed using Eq. (1), the sampling rays are shifted versions of each other. They pass through a 2D $N_w$ by $N_w$ sampling grid or window, with the 2D sampling window being perpendicular to the direction of the sampling rays. The sampling window covers the visual extent of the object being modeled. A side view of the rays is shown in FIG. 7A. While any number of rays can be employed, in tested embodiments, the number of rays was tied to the size of $N_w$, as measured in pixels, such that there was no more than one ray for each pixel. As an example, it is noted that $N_w$ ranged from 16 to 512 in various experiments with the tested embodiments. Thus, the number of rays could range from 256 to 262, 144.

Referring once again to FIG. 5A, a previously unselected one of the generated rays is then selected (process action 504) and it is determined if the selected ray transects the object being modeled (process action 506). If the ray does not transect the object, then another ray is selected and processed by repeating actions 504 and 506. Otherwise, in process action 508, the 3D coordinates of the nearest point of intersection $p_n$ of the selected ray with the object in the selected direction is identified. In addition, in process action 510, the 3D coordinates of the furthest point of intersection $p_f$ of the selected ray with the object in the selected direction is identified. The distance $\mu$ between $p_n$ and $p_f$ is then computed (process action 512). This distance represents the thickness of the object as transected by the selected ray. Next, in process action 514, it is determined if there are any remaining previously unselected rays generated for the selected direction. If so, then actions 504 through 514 are repeated. However, if all the rays have been processed, then the distance values $\mu$ associated with the selected direction are normalized (process action 516). This normalizing action is performed because the distance values are scale-dependent. In order to obtain a scale-independent representation, the distance values are normalized. This can be accomplished by dividing each of the values by the maximum distance value $\mu_{max}(\theta,\phi)$.

A thickness histogram $H_{\theta,\phi}(\mu)$ for the selected direction is then constructed using the normalized distance values $\mu$ (process action 518). It is next determined if there are any remaining previously unselected sampling directions (process action 520). If there are, process actions 500 through 520 are repeated for the each of the remaining directions to produce additional thickness histograms associated with the object being modeled. If, however, all the directions have been considered, then in process action 522, the thickness histograms computed for each of the selected directions are designated as the directional histogram model for the object, and the process ends.

Figure 6A:
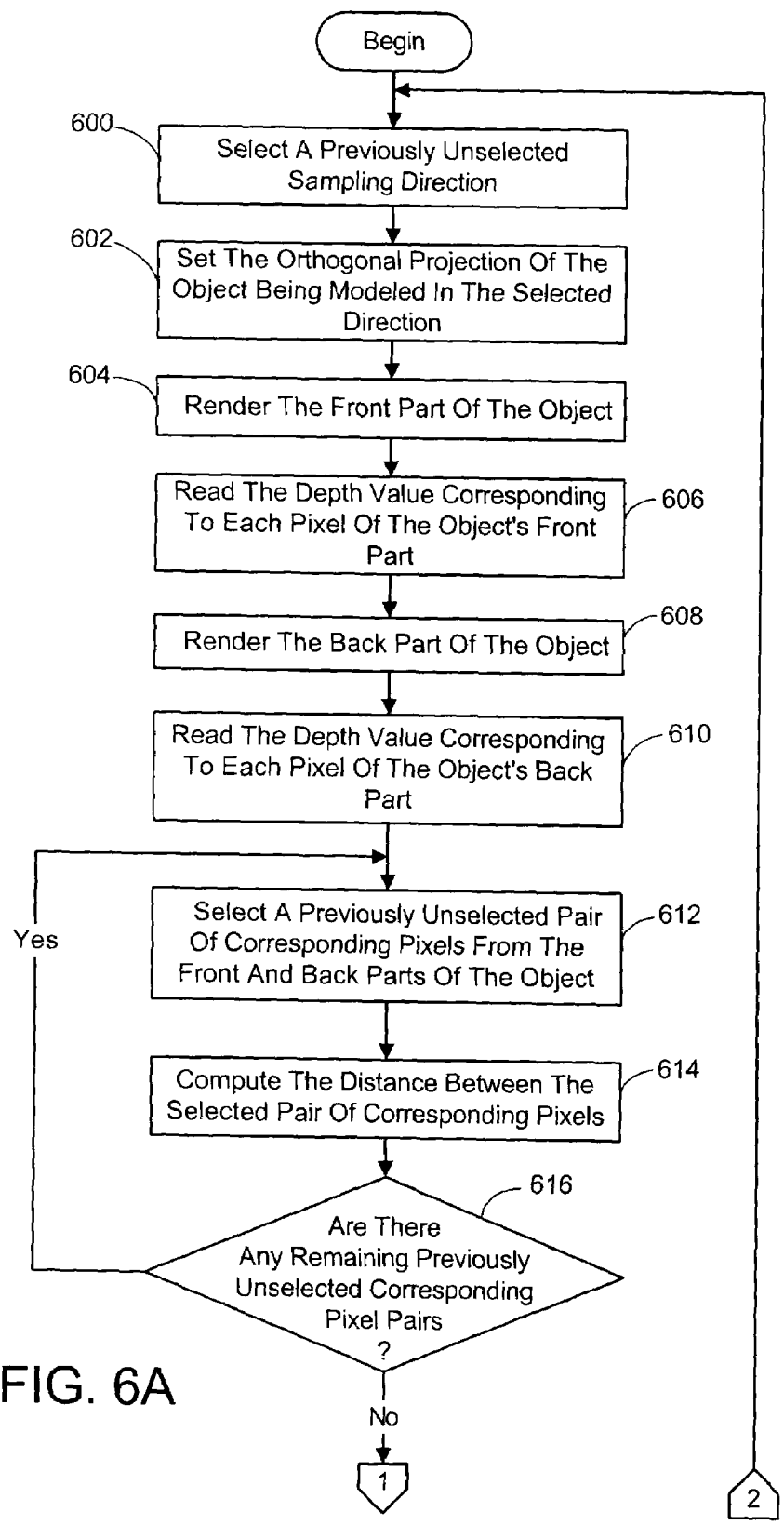
FIGS. 6A and 6B are a flow chart diagramming an alternate embodiment of a process for generating a directional histogram model of an object as part of the process of FIGS. 2A and B, which employs a graphics accelerator.
Figure 6B:
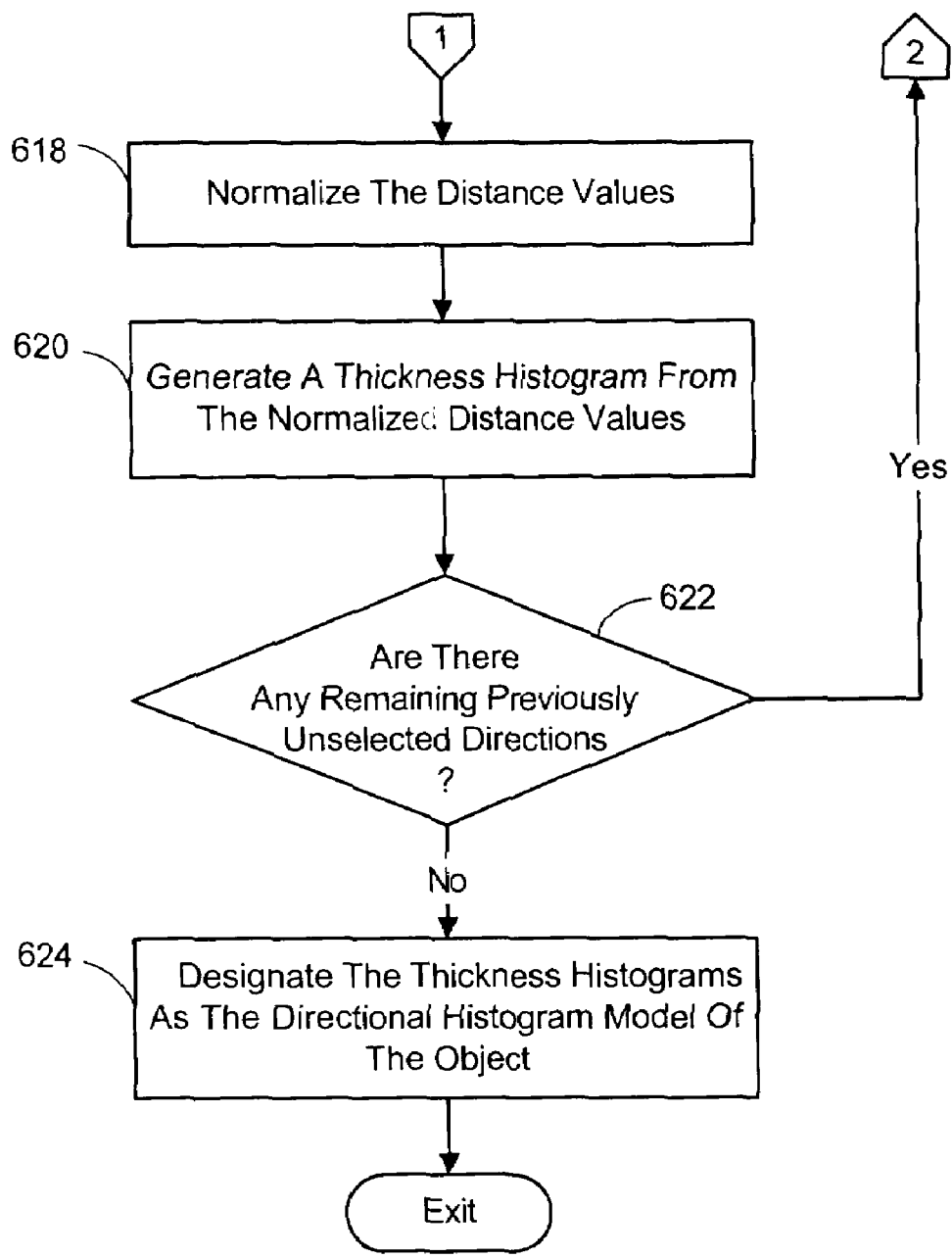

The computation of the thickness histogram can also be accelerated using commercially-available graphics hardware (e.g., graphics accelerator cards). For a given sampling direction, the front of the object is rendered and its depth values are read. This is then repeated for the back of the object. The thickness is the difference between the front and back depth values. More particularly, referring to FIGS. 6A and 6B, one way of accomplishing the accelerated approach is as follows. First, a previously unselected sampling direction $(\theta,\phi)$ is selected (process action 600). The orthogonal projection of the object being modeled is then set in the selected direction (process action 602), and the front part of the object associated with the selected direction is rendered (process action 604). The depth value $B_f$ corresponding to each pixel of the object's front part is then read (process action 606). The back part of the object associated with the selected direction is then rendered (process action 608) and the depth value $B_b$ corresponding to each pixel are read (process action 610). A previously unselected pair of corresponding pixels of the front and back parts is selected next (process action 612), and the distance between the depth values associated therewith is computed as $B_b - B_f$ (process action 614). It is then determined if all the corresponding pixel pairs have been considered (process action 616). If not, then process actions 612 and 616 are repeated until a distance value has been computed for each pixel pair. When all the pixel pairs have been considered, then the distance values µ associated with the selected direction are normalized (process action 618). As before, this can be accomplished by dividing each of the values by the maximum distance value $\mu_{max}(\theta,\phi)$.

A thickness histogram $H_{\theta,\phi}(\hat{\mu})$ for the selected direction is then constructed using the normalized distance values $\hat{\mu}$ (process action 620). It is next determined if there are any remaining previously unselected sampling directions (process action 622). If there are, process actions 600 through 622 are repeated for the each of the remaining directions to produce additional thickness histograms associated with the object being modeled. If, however, all the directions have been considered, then in process action 624, the thickness histograms computed for each of the selected directions are collectively designated as the directional histogram model for the object, and the process ends.

It is noted that in the accelerated process, the thickness of the object in each direction is defined on a pixel basis with a different distance value being computed for each pair of corresponding pixel locations in the front and back rendering of the object. Thus, in essence each corresponding pixel pair defines a ray in the selected direction similar to the previously described process.

It is further noted that in the foregoing accelerated procedure, the object's back part can be rendered by setting the initial z-buffer values as 1 and the depth comparison function to let the greater z-values pass, e.g., glDepthFunc (GL_GEQUAL) in an OpenGL implementation.

To simplify future similarity computations between objects represented with a directional histogram model, the distance values µ can be uniformly quantized into M integer values after being normalized. M=64 worked well in the tested embodiments. Further, to facilitate the directional histogram model's conversion into the aforementioned matrix descriptor, each thickness histogram making up the model can also be normalized such that $$\int |H_{\theta,\phi}(\mu)|^2 d\mu = 1, \text{ i.e., } \sum_{k=0}^{M-1} \left|H_{\theta,\phi}\left(\frac{k}{M}\right)\right|^2 = 1. \quad (2)$$

Invariance Properties 4 and 5, which will be discussed shortly, both rely on this histogram normalization.

FIGS. 7(a) and (b) illustrate the sampling geometry employed to calculate a histogram in direction $(\theta,\phi)$. In FIG. 7(a), for a particular direction $(\theta,\phi)$, a group of parallel rays is shown which traverse a shape (i.e., a rabbit). The distance on each ray from the first intersection point to the last intersection point is shown as solid lines, whereas outside the shape the rays are shown as dashed lines. It is noted that not all the sampling rays are shown for the sake of clarity. FIG. 7(b) is an example histogram representing a possible thickness distribution for the sampling of the shape at the direction $(\theta,\phi)$ under consideration.

2.2 Matrix Descriptor

Based on the model construction process, it is clear that the directional histogram model is invariant to translation and scaling. But it is still orientation dependent. To remove the dependence on orientation, a new representation will be derived from the directional histogram model, called a matrix descriptor.

To create this matrix descriptor, the directional histogram model is characterized as M number of spherical functions $H_k(\theta,\phi)$ defined on a unit sphere:

$$H_k(\theta,\phi) \equiv H\left(\theta, \phi, \frac{k}{M}\right).$$

Spherical harmonic analysis yields:

$$H_k(\theta,\phi) = \sum_{l=0}^{\infty} \sum_{m=-l}^{l} h_{klm} Y_{lm}(\theta,\phi), \quad (3)$$

where $h_{klm}=<H_k(\theta,\phi),Y_{lm}(\theta,\phi)>$, and $Y_{lm}(\theta,\phi)$ are the spherical harmonic functions. One of the most useful properties of $Y_{lm}(\theta,\phi)$ is that $Y_{lm}(\theta+\alpha,\phi+\beta)=\Sigma_{mm'=-l}^{l} D_{mm'}^{l}(\alpha)e^{im'\beta}Y_{lm'}(\theta,\phi)$, where the combination coefficients satisfy: $\Sigma_{m'=-l}^{l}|D_{mm'}^{l}(\alpha)|^2=1$.

Since $\Sigma_{l=0}^{l}\Sigma_{m=-l}^{l}h_{klm}Y_{lm}(\theta,\phi)$ converges to $H_k(\theta,\phi)$ as $L \to \infty$, it can be assumed that $H_k(\theta,\phi)$ is bandwidth limited for simplicity. Assuming that the bandwidth of $H_k(\theta,\phi)$ is less than N, then:

$$H_k(\theta,\phi) = \sum_{l=0}^{N} \sum_{m=-l}^{l} h_{klm} Y_{lm}(\theta,\phi). \quad (4)$$

Based on the spherical harmonic coefficients $h_{klm}$, the matrix descriptor M is defined as $M=(a_{lk})_{M \times N}$, where $$a_{lk} = \sqrt{\sum_{m=-l}^{l} |h_{klm}|^2}. \quad (5)$$

In the above definition, $a_{lk}$ represents the energy sum of $H_k(\theta,\phi)$ at band l. Therefore, the matrix descriptor gives the energy distribution of the directional histogram model over each (discrete) thickness value and each band index—a distribution that does not change with rotation.

2.3 Invariance Properties

In this section, the matrix descriptor is analyzed in regard to its invariance properties. For the purposes of this analysis, the matrix descriptor is considered to be separate from the directional histogram model, even though the matrix descriptor is derived from the directional histogram model. The first property of the matrix descriptor to be analyzed will show that:

Property 1: The matrix descriptor M of a 3D object is invariant to rotation, translation and scaling.

Since the directional histogram model is invariant to translation and scaling as described previously, the matrix descriptor is invariant to translation and scaling as well. Thus only orientation invariance needs to be explained. Suppose the object is rotated by angles $(\alpha, \beta)$, then the directional histogram model of the rotated object is $H'(\theta,\phi,\mu)=H(\theta+\alpha,\phi+\beta,\mu)$. Therefore, $$h'_{klm} = \langle H'_k(\theta+\alpha, \phi+\beta), Y_{lm}(\cdot) \rangle$$

-continued $$= \left\langle \sum_{s=0}^{N} \sum_{t=-s}^{s} h_{kst} Y_{st}(\theta + \alpha, \phi + \beta), Y_{lm}(\cdot) \right\rangle$$

$$= \left\langle \sum_{s=0}^{N} \sum_{t=-s}^{s} h_{kst} \sum_{r=-s}^{s} D_{tr}^{s}(\alpha) e^{it\beta} Y_{sr}(\cdot), Y_{lm}(\cdot) \right\rangle$$

$$= \sum_{s=0}^{N} \sum_{t=-s}^{s} \sum_{r=-s}^{s} h_{kst} D_{tr}^{s}(\alpha) e^{it\beta} \langle Y_{sr}(\cdot), Y_{lm}(\cdot) \rangle$$

$$= \sum_{t=-l}^{l} h_{klt} D_{tm}^{l}(\alpha) e^{it\beta},$$

where "·" denotes θ,φ. Using the orthogonality property of $e^{it\beta}$, $$|h'_{klm}|^2 = \sum_{t=-l}^{l} |h_{klt}|^2 |D_{tm}^{l}(\alpha)|^2$$

$$\sum_{m=-l}^{l} |h'_{klm}|^2 = \sum_{m=-l}^{l} \sum_{t=-l}^{l} |h_{klt}|^2 |D_{tm}^{l}(\alpha)|^2$$

$$= \sum_{t=-l}^{l} |h_{klt}|^2 \sum_{m=-l}^{l} |D_{tm}^{l}(\alpha)|^2$$

$$= \sum_{t=-l}^{l} |h_{klt}|^2$$

$$= \sum_{m=-l}^{l} |h_{klm}|^2.$$

Since $a'_{lk} = a_{lk}$ and $M = M'$, the matrix descriptor of an object is invariant to rotation.

Let $M_i$ be the matrix descriptor derived from a directional histogram model $H_i$, i=0.1. If $M_0 = M_1$, then $H_0$ and $H_1$ are equivalent models, denoted by $$H_0 \sim H_1.$$

Property 2: The matrix descriptor M of a 3D object is invariant to origin-symmetric transform and mirror transform.

Since the directional histogram model of a 3-D object is origin-symmetric, $H(\theta,\phi,\mu) = H(-\theta+\pi,\phi+\pi,\mu)$. Then, $H(\theta,\phi,\mu) \sim H(-\theta+\pi,\phi+\pi,\mu)$, and so the matrix descriptor M is invariant to origin-symmetric transform.

To show the invariance to mirror transform, it can be assumed that the mirror is the X-Y plane without loss of generality according to Property 1. Let H'(θ,φ,μ) be the directional histogram model of the mirrored object. Then $$H'(\theta,\phi,\mu) = H(-\theta+\pi,\phi,\mu)$$

$$\sim H(-\theta+\pi,\phi+\pi,\mu) = H(\theta,\phi,\mu).$$

Therefore, the matrix descriptor is invariant to mirroring.

Property 3: If $M=(a_{lk})_{M\times N}$ is a matrix descriptor. Then, $a_{lk}=0$, if l is odd. When l is odd, $Y_{lm}(-\theta+\pi,\phi+\pi) = -Y_{lm}(\theta,\phi)$. Since $H_k(\theta,\phi) = H_k(-\theta+\pi,\phi+\pi)$, then $$h_{klm} = \langle H_k(\theta,\phi), Y_{lm}(\theta,\phi) \rangle$$

$$= \langle H_k(-\theta+\pi,\phi+\pi), -Y_{lm}(-\theta+\pi,\phi+\pi) \rangle$$

$$= -h_{klm}.$$

Therefore, $h_{klm}=0$, and $a_{lk}=\sqrt{\sum_{m=-l}^{l}|h_{klm}|^2}=0$.

Property 4: The squared sum of the matrix descriptor elements is 1.

$$\sum_{l=0}^{N-1} \sum_{k=0}^{M-1} a_{lk}^2 = \sum_{k=0}^{M-1} \sum_{l=0}^{N-1} \sum_{m=-l}^{l} \|h_{klm}\|^2$$

$$= \sum_{k=0}^{M-1} \oint_s \|\mathcal{H}_k(\theta,\phi)\|^2 ds$$

$$= \oint_s \sum_{k=0}^{M-1} \|\mathcal{H}_k(\theta,\phi)\|^2 ds$$

$$= \oint_s \sum_{k=0}^{M-1} \left\|\mathcal{H}_{\theta,\phi}\left(\frac{k}{M}\right)\right\|^2 ds$$

$$= \oint_s ds$$

$$= 1,$$

where s denotes the unit sphere, and $\oint_s ds = 1$ is assumed in the spherical harmonic analysis.

3.0 Shape Similarity

Let $O_1$, $O_2$ be two 3D objects. The similarity between $O_1$ and $O_2$ can be measured using the norm of their matrix descriptors' difference $M(O_1)-M(O_2)$:

$$d(O_1,O_2) = \|M(O_1)-M(O_2)\|. \tag{6}$$

Any matrix norm can be used, however, for the following description it will be assumed the matrix norm employed is the $L^p$ norm, with p=2.

Let $v_l$ be the l-th row vector in a shape matrix. Note that the $v_l$ represents the energy of the directional histogram model at l-th frequency, and can be weighted when calculating the object distance. When using the $L^p$ norm, the weighted form of distance function can be represented as $$d_p(O_1, O_2) = \left(\sum_{l=0}^{M} \omega_l \|v_{1l} - v_{2l}\|^p\right)^{1/p}, \tag{7}$$

where $v_{jl}$ is the l-th row vector in the shape matrix of object $O_j$, $\omega_l > 0$ are the weights, and $\|\cdot\|$ is the $L^p$ norm of a vector. By adjusting the weights, it is possible to emphasize the importance of objects at some frequency when evaluating the shape similarity. In tested embodiments, p=2 was chosen and all weights $\omega_l=1$. With this choice, the following property on the $d_2$ distance function holds.

Property 5: The $d_2$ distance between any two objects is between 0 and $\sqrt{2}$.

Since the elements in the matrix descriptor are all positive, $d_2^2(O_1,O_2)=\Sigma_{l,k}(a_{1lk}-a_{2lk})^2<\Sigma_{l,k}(a_{1lk}^2+a_{2lk}^2)$. Then, $d_2^2(O_1,O_2)<2$, according to Property 4. Therefore $d_2(O_1,O_2)<\sqrt{2}$.

4.0 Performance

In this section, the performance of the directional histogram model is addressed.

4.1 Computational Cost

First, the computational cost to generate the directional histogram model will be examined. Assume a square window, with window size $N_w$ (i.e., window width), is used to render the object in the previously described hardware accelerated approach. Recall that $N_s$ is the number of angles $\theta$ and $\phi$ (i.e., sampling rate). For each direction $\theta_i,\phi_j$, the object is rendered twice, and the depth buffer is read twice as well.

Figure 8A:
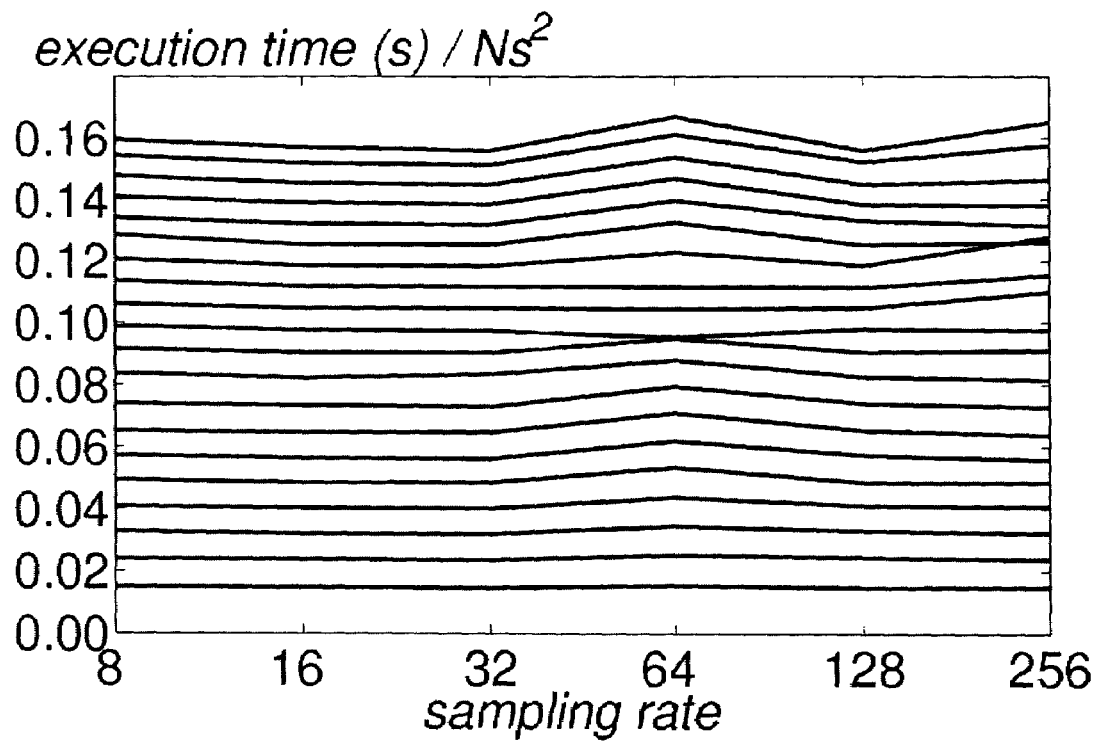
FIGS. 8(a) and 8(b) are graphs showing performance results where each object used for testing corresponds to a curve in the graphs. For curves from bottom to top, the vertex number of the corresponding object ranges uniformly from 5,000 to 100,000.
Figure 8B:
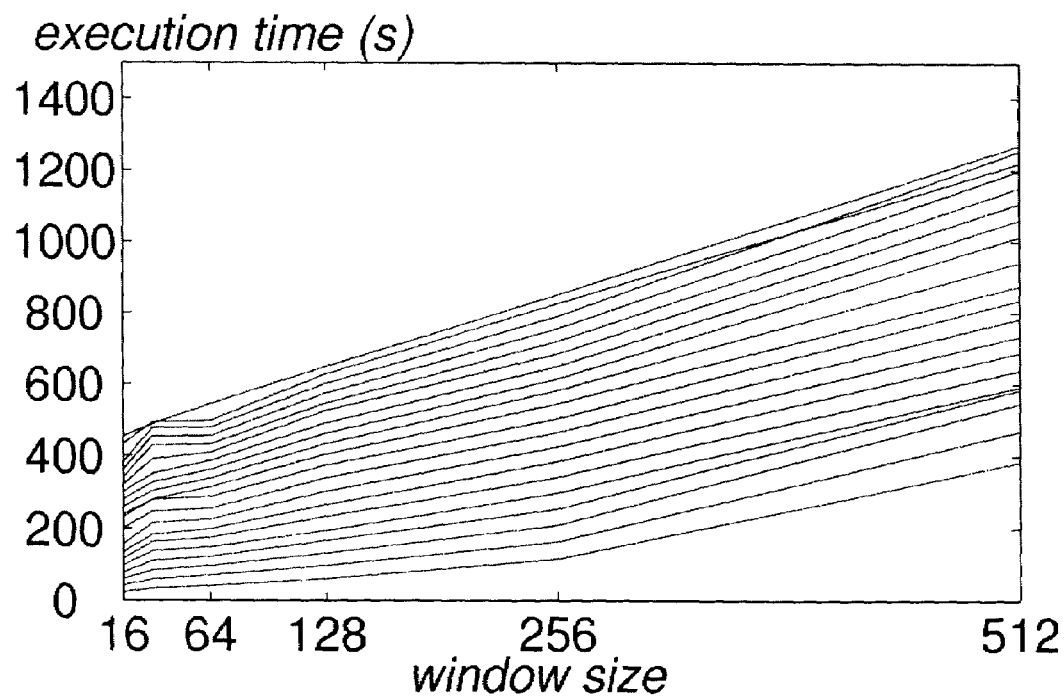

Fortunately, only half of all the sampling directions are needed, since opposing directions produce the same thickness histograms as shown by Property 2. As a result, the bulk of time cost is $T=N_s^2(T_b(N_w)+T_r(N_w))$, where $T_b(N_w)$ is the time cost to read the depth buffer values from a $N_w \times N_w$ window and $T_r(N_w)$ is the render time in the same window. Usually, $T_r(N_w)$ is roughly proportional to the object's face number $N_f$, i.e., $T_r(N_w) \approx \lambda_{N_w} N_f$, where $\lambda_{N_w}$ is a constant. Therefore, $T \approx N_s^2(T_b(N_w)+\lambda_{N_w} N_f)$. This is verified by the performance results shown in FIGS. 8(a) and 8(b). In these figures, many objects are used for testing, each of which corresponds to a curve. For curves from bottom to top, the vertex number of the corresponding object ranges uniformly from 5,000 to 100,000. In FIG. 8(a) the execution time is plotted against the sample rate at a window size of $N_w=128$. In FIG. 8(b) the execution time is plotted against the window size at a sampling rate of $N_s=64$. The curves in FIGS. 8(a) and 8(b) show that the execution time is approximately proportional to the squared sampling rate and the window size.

4.2 Window Size

For a given sampling direction, the number of intersecting rays used to sample the object thickness distribution is proportional to the squared window size $N_w^2$. It is reasonable to expect that a higher ray density should produce more accurate thickness distribution. If the ray density is too coarse, the resulting thickness distribution and the final matrix descriptor will be strongly dependent on the location of the object as it is being sampled.

The relationship between the error of the matrix descriptor introduced by perturbing the object and the window size $N_w$ was examined extensively in tested embodiments of the present invention. A 3D dragon model was first simplified to generate objects of varying complexity. FIGS. 9(a)-(c) show three (out of nine) simplified models of the dragon. The complexity of 3-D object was measured by its average edge length (normalized with respect to the diameter of the object bounding sphere). For each window size $N_w=32/64/128/256$ and for each dragon object, the matrix descriptor is computed 50 times, each time with the model randomly perturbed. These matrix descriptors were then compared with the reference matrix descriptor computed without disturbing the model, and perturbation error was analyzed with the usual statistics of mean and standard deviation. (The matrix is compared using the $L^2$ norm in tested embodiments).

Figure 10A:
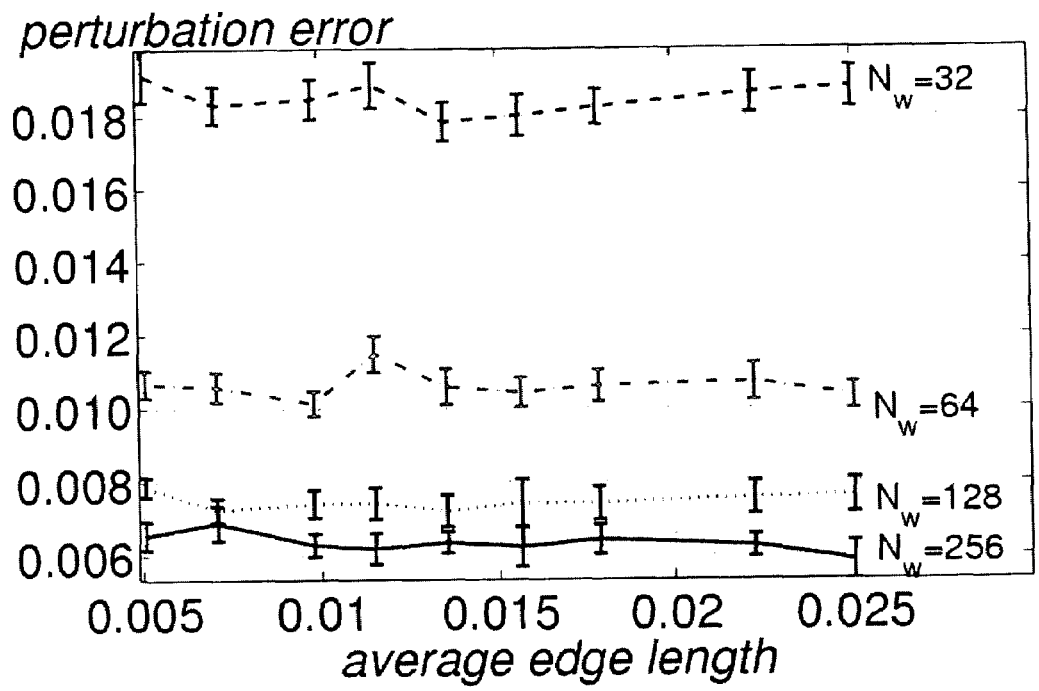
FIGS. 10(a) and 10(b) are graphs summarizing the results of a test in which for each of a series of window sizes and for each of 9 progressively simplified mesh models of a dragon, a matrix descriptor is computed 50 times, with the model under consideration being randomly perturbed each time. These matrix descriptors were compared with a reference matrix descriptor computed without disturbing the model, and the perturbation error was analyzed. The graphs in FIGS. 10(a) and 10(b) show the relationship between the matrix descriptor and window size. More particularly, FIG. 10(a) plots perturbation error (with standard deviation bars) against the average edge length for different window sizes, and FIG. 10(b) plots perturbation error against the ray interval.
Figure 10B:
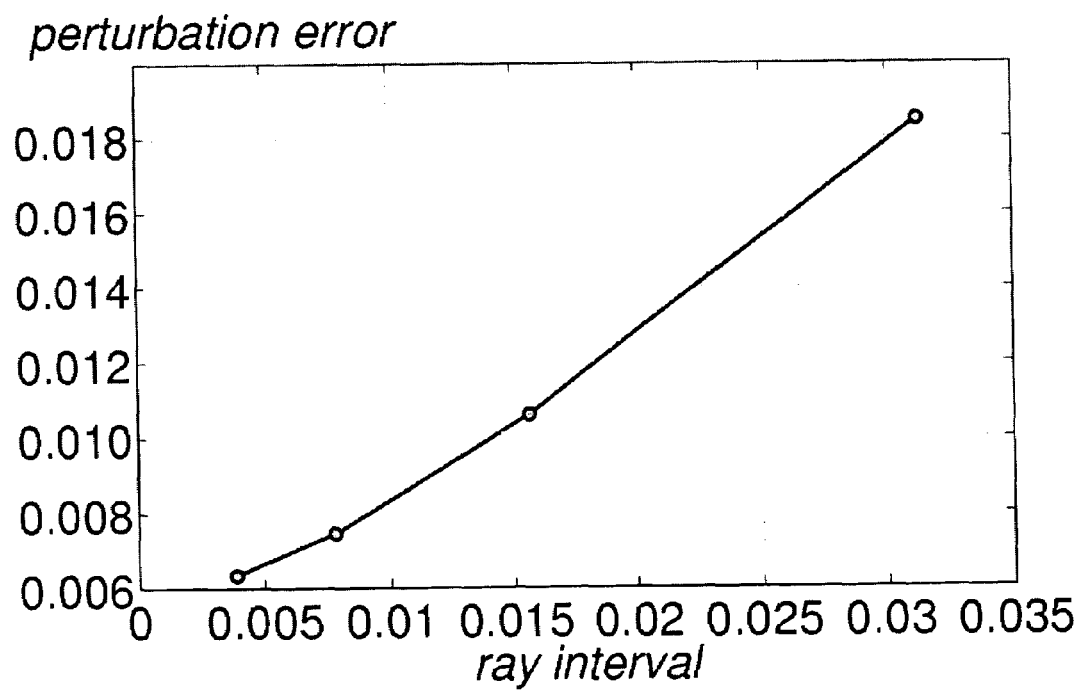

The results of the foregoing test are summarized in FIGS. 10(a) and 10(b), which show the relationship between the matrix descriptor and window size. More particularly, FIG. 10(a) plots perturbation error (with standard deviation bars) against the average edge length for different window sizes ($N_w$), and FIG. 10(b) plots perturbation error against the ray interval ($1/N_w$). FIG. 10(a) shows that the perturbation error is quite constant for different object complexity. FIG. 10(b) shows an interesting trend of the perturbation error being roughly proportional to the ray interval (i.e., inversely proportional to the window size). While this shows that a larger window size is better, it would decrease the rendering speed and depth buffer extraction. It was found that $N_w=128$ is a good trade-off.

4.3 Directional Sampling Rate

For a typical object with 20K vertices in a sample database and a 128×128 window, it is possible to render the object and read the depth buffer at about 30 fps. Therefore, the total time cost is about $\frac{1}{30}N_s^2$ seconds. In addition, a strict limitation on the sampling rate $N_s$ is imposed for efficiency. Recall that the bandwidth of $H_k(\theta,\phi)$ is assumed as N, thus at least 2N×2N samples are needed for $H_k(\theta,\phi)$ according to spherical harmonic analysis [6]. However, in practice, the bandwidth of $H_k(\theta,\phi)$ is not necessarily limited. Using a finite number of samples would then result in loss of information (power).

Because the power distribution of $H_k(\theta,\phi)$ depends on the object shape, the number of samples needed for arbitrary objects remains unknown. This problem is analyzed as follows. First, the matrix descriptor $M_N$ is calculated for many objects at different sampling rates $N_s$. For each object, the quality of the approximation due to the sampling rate is calculated by comparing them against $M_{256}$ (where $M_{256}$ is used as the ground truth $M_\infty$, which is not possible to obtain in practice).

Figure 11A:
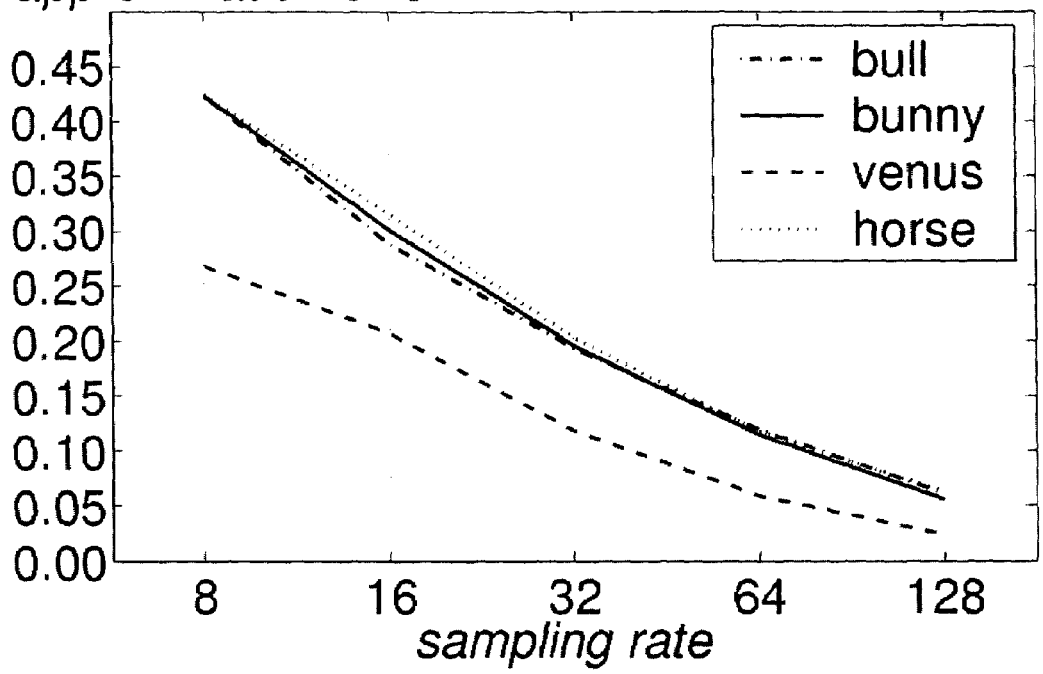
FIG. 11(a) is a graph summarizing the results of a test in which the matrix descriptor is calculated for many objects at different sampling rates, and for each object, the quality of the approximation due to the sampling rate was calculated. Specifically, the approximation errors are plotted against the sampling rate in the graph.

The results of this test shown in FIG. 11(a), where the approximation errors are plotted against the sampling rate, indicates that the approximation error drops very quickly as the sampling rate is increased. A sampling rate at least $N_s=128$ was determined to be a reasonable choice. However, it will take about 8 minutes to generate the directional histogram model for a typical object in the database when $N_s=128$. While this is not unreasonable, it is impractical for time-critical applications such as for 3-D search engines for web applications. As a result, the sampling rate can be reduced, albeit at the expense of fidelity of representation.

Figure 11B:
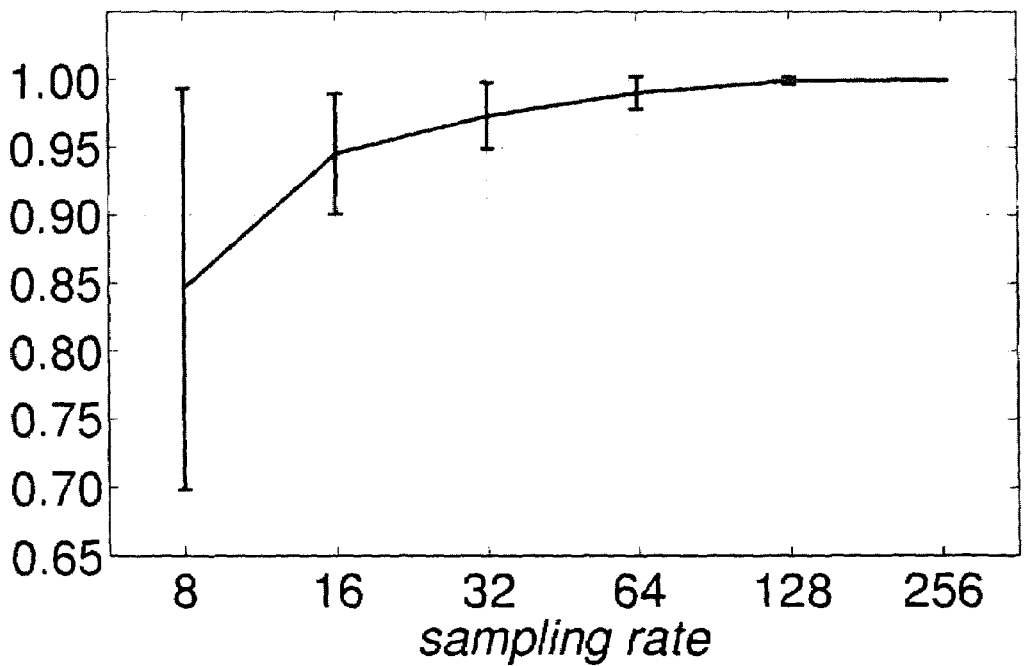
FIG. 11 (b) is a graph summarizing the results of a test in which distances between pairs of different objects under different sampling rates were computed. The graph shows the average (with standard deviation bars) of the normalized distance plotted against the sampling rate.

In another set of tests, distances between pairs of different objects under different sampling rates ($N_s=8/16/32/64/128/256$) were computed. Basically, the larger the distance, the better the discrimination power. Results indicate that most of the distances increase monotonically as $N_s$ is increased. To enable comparisons between different objects, the distance with respect to the distance at $N_s=256$ is normalized for each object pair. The graph of the average (with standard deviation bars) is shown in FIG. 11(b) where the normalized distance is plotted against the sampling rate. This graph clearly shows that the sampling rate $N_s=16$ is sufficient for shape similarity estimation, and increasing the sampling rate to more than 16 would produce only marginal improvements in accuracy at the expense of speed. Note that it takes about only 8 seconds when $N_s=16$.

While the matrix descriptor of an object is theoretically invariant to rigid transform and scaling, it will change to some degree when the object undergoes these transformations because of the finite $N_s^2$ directional sampling. In tested versions of the present invention, it was found that the variances introduced by scaling and translation are very small. The variances introduced by rotation are somewhat larger, but they are not significant with a sampling rate of $N_s \geq 16$, as indicated by Table 1 shown in FIG. 12, where the matrix descriptor of the rotated object is compared against with that of the original object. Results under two sampling rates are listed.

4.4 Object Simplification

Computational cost analysis shows that the time cost is proportional the object complexity in terms of the face/vertex number. State-of-art simplification techniques (e.g., [5, 8, 9]) are capable of simplifying large objects quickly (typically, in only a few seconds). Using an efficient model simplification technique before sampling the thickness distributions would clearly be advantageous.

Generally, model simplification may introduce some error into the matrix descriptors. This is referred to as the simplification error. How much of a simplification error depends on the simplification level. To study this effect, many trials were run involving many objects, and the results are summarized in FIG. 13, which shows the error in the matrix descriptor introduced by simplification. The simplification is characterized by the normalized average edge length of the simplified model.

The simplified object is characterized by its normalized average edge length with respect to the object bounding sphere's diameter. The results show that within the range of simplification used, only small simplification errors (e.g., <0.06) are obtained. Note that the most simplified versions of the "dinosaur", "wolf", "man" and "bunny" models consist of only 1300,1500,982,1556 vertices respectively. In FIG. 13, the window size for rendering is $N_w=128$. It is curious to note that the curves increase more dramatically after an average vertex distance of 0.0125 (shown by a vertical line in FIG. 13), which corresponds to about 1.5 times the ray interval.

5.0 Object Comparison and Retrieval

For shape similarity comparison, it was found that $N_s=16$, $N_w=128$ is a set of good sampling parameters in terms of accuracy and efficiency, based on discussion in Section 4.0. Using these sampling parameters, it is possible to obtain the shape comparison results indicated by Table 2 shown in FIG. 14. In FIGS. 15(*a*)-(*h*), the shape similarity between interpolated objects is compared. FIG. 15(*a*) represents the original object, while FIGS. 15(*b*)-(*g*) represent interpolated objects between the objects of FIG. 15(*a*) and (*h*). The number under each object is the distance to the original object. It is interesting to note that as the object is morphed to another, the distance actually increases monotonically as expected.

Figure 16:
FIG. 16 is a table showing the objects in a database of objects characterized using the matrix descriptor according to the present invention that were found to have the lowest degree of difference to a matrix descriptor of a sample object, where the sample object is shown in the first column of the table and the similar database objects are shown in order of their similarity to the sample object in the row adjacent the sample object.

Based on the shape similarity measurement process described in Section 3, a simple shape based 3D object retrieval prototype system can be constructed. In this prototype, a sample shape would be specified by a user, and the matrix descriptor is computed for the sample shape. The sample shape matrix descriptor is compared as described previously to a database of pre-computed and stored matrix descriptors corresponding to a number of 3D objects. In one prototype system, a prescribed number of the most similar objects, i.e., those having the lowest distance values from the sample shape, were identified as similar objects. Some input and output examples of the prototype system are shown in FIG. 16. In this example, a sampling rate of $N_s=16$ was used to speed up the comparison process. To further reduce the matrix variance due to rotation at sampling rate $N_s=16$, as indicated in Table 1 of FIG. 12, a simple pre-orientation procedure was applied. In particular, Principle Component Analysis (PCA) was employed to compute the major axis for automatic alignment.

6.0 Matrix Descriptor For 2D Objects

While the invention has been described in detail by specific reference to preferred embodiments thereof, it is understood that variations and modifications thereof may be made without departing from the true spirit and scope of the invention. For example, the above-described directional histogram model and matrix descriptor can be adapted to 2D objects as well. Given a 2D object, the 2D directional histogram model is a 2D function $H(\theta,\phi): [0,2\pi]\times[0,1]\mapsto R$, where $\phi$ is the direction parameter. For each $\phi$, $H_\phi(\mu) \equiv H(\theta,\mu)$ gives the depth distribution of the object along the direction $\phi$. Applying a Fourier transform to the 2D directional histogram model yields:

$$H_k(\phi)=H(\phi,k/M)=\Sigma_{l=0}^{\infty}h_{kl}e^{-il\phi}. \qquad (8)$$

The 2D object's matrix descriptor can also be derived using the Fourier-coefficients $h_{kl}$ similarly: $M=(a_{lk})_{M\times N}$, $a_{lk}=\sqrt{|h_{kl}|^2}$. In addition, the element $a_{lk}$ of an odd l index is zero, and the squared sum of all the matrix descriptor elements is 1. Based on the 2-D matrix descriptor, the distance function $d_p$ is also well-defined for 2-D object, and ranges from 0 to $\sqrt{2}$.

The distance function $d_p$ is also well defined for 2D objects with the use of 2D matrix descriptors. Since the matrix descriptor is invariant to rigid transform and scaling, the distance function in Eq. (4) is also invariant to rigid transform and scaling. Similar to 3D object's matrix descriptor, the 2D objects' matrix descriptor is also invariant to rotation, symmetric transform, and mirror transform. 2 5 It is clear that the distance functions for 2D/3D objects in Eq. (4) is a metric, since the matrix descriptor lies in linear space, and the $L^p$ norm is used.

7.0 References

[1] M. Ankerst, G. Kastenmuller, H. P. Kriegel, and T. Seidl. 3D shape histograms for similarity search and classification in spatial databases. In *Advances in Spatial Databases, 6th International Symposium, SSD'99*, volume 1651, pages 207-228, Hong Kong, China, 1999. Springer.

[2] Stefan Berchtold and HansPeter Kriegel. S3: similarity search in cad database systems. In *Proceedings of the 1997 ACM SIGMOD international conference on Management of data*, pages 564-567. ACM Press, 1997.

[3] C. M. Cyr and B. B. Kimia. 3d object recognition using shape similarity-based aspect graph. In *ICCV01*, pages I: 254-261, 2001.

[4] Thomas Funkhouser, Patrick Min, Michael Kazhdan, Joyce Chen, Alex Halderman, David Dobkin, and David Jacobs. A search engine for 3d models. *to appear in ACM Transactions on Graphics* 2003.

[5] Michael Garland and Paul S. Heckbert. Surface simplification using quadric error metrics. In *Proceedings of the 24th annual conference on Computer graphics and interactive techniques*, pages 209-216. ACM Press/Addison-Wesley Publishing Co., 1997.

[6] Dennis M. Healy, Daniel N. Rockmore, and Sean S. B. Moore. FFTs for the 2 sphere improvements and variations. Technical Report PCSTR96292, 1996.

[7] Masaki Hilaga, Yoshihisa Shinagawa, Taku Kohmura, and Tosiyasu L. Kunii. Topology matching for fully automatic similarity estimation of 3d shapes. In *Proceedings of the 28th annual conference on Computer graphics and interactive techniques*, pages 203-212. ACM Press, 2001.

[8] Leif Kobbelt, Swen Campagna, and HansPeter Seidel. A general framework for mesh decimation. In *Graphics Interface*, pages 43-50, 1998.
[9] Peter Lindstrom and Greg Turk. Fast and memory efficient polygonal simplification. In *IEEE Visualization*, pages 279-286, 1998.
[10] Ryutarou Ohbuchi, Tomo Otagiri, Masatoshi Ibato, and Tsuyoshi Takei. Shape similarity search of three dimensional models using parameterized statistics. In *IEEE Proceedings of Pacific Graphics* 2002, pages 265-274. IEEE Computer Society, October 2002.
[11] R. Osada, T. Funkhouser, B. Chazelle, and D. Dobkin. Matching 3D models with shape distributions. In *Shape Modeling International*, pages 154-166, May 2001.
[12] Motofumi T. Suzuki. A web-based retrieval system for 3d polygonal models. In *Joint 9th IFSA World Congress and 20th NAFIPS International Conference (IFSA/NAFIPS2001)*, pages 2271-2276, 2001.
[13] D. V. Vranic and D. Saupe. 3d shape descriptor based on 3d fourier transform. In *Proceedings of the EURASIP Conference on Digital Signal Processing for Multimedia Communications and Services*, pages 271-274, September 2001.
[14] D. V. Vranic and D. Saupe. Description of 3d shape using a complex function on the sphere. In *Proceedings of the IEEE International Conference on Multimedia and Expo (ICME 2002)*, pages 177-180, August 2002.
[15] D. V. Vranic, D. Saupe, and J. Richter. Tools for 3d object retrieval:
Karhunenloeve transform and spherical harmonics. In *Proceedings of the IEEE* 2001 *Workshop Multimedia Signal Processing*, pages 293-298, October 2001.

Wherefore, what is claimed is:

1. A computer-implemented process for generating a representation of an object, comprising using a computer to perform the following process actions:
   for a prescribed number of directions,
      determining the thickness of the object along each of a prescribed number of parallel rays directed through the object in the direction under consideration,
      normalizing the determined thickness values of the object, and
      generating a thickness histogram for the object from the normalized values;
   wherein the thickness histograms associated with the prescribed directions define a directional histogram model of the object which is employed as a representation of the object that is substantially invariant in regard to translation and scaling.

2. The process of claim 1, wherein the process action of determining the thickness of the object for a prescribed parallel ray directed through the object, comprises actions of:
   identifying the 3D coordinates of the nearest point of intersection of the ray with the object;
   identifying the 3D coordinates of the furthest point of intersection of the ray with the object;
   computed the distance between the 3D coordinates of the nearest point of intersection and the furthest point of intersection, wherein the computed distance represents the thickness of the object as transected by the ray.

3. The process of claim 1, wherein the process action of determining the thickness of the object for a prescribed parallel ray directed through the object, comprises actions of:
   rendering an image of the front of the object using a 3D graphics accelerator and reading the depth value corresponding to each pixel of the object's front;
   rendering an image of the back of the object using the 3D graphics accelerator and reading the depth value corresponding to each pixel of the object's back;
   computing the distance between the depth values associated with a pair of corresponding pixels for each pair of corresponding pixels of the images of the front and back of the object, wherein the computed distance represents the thickness of the object as would be transected by a parallel ray directed through the corresponding pixels from the direction under consideration.

4. The process of claim 1, wherein the process action of normalizing the thickness values, comprises an action of dividing each of the values by the maximum thickness value.

5. The process of claim 1, further comprising the process action of uniformly quantizing the thickness values after they have been normalized.

6. The process of claim 5, wherein the thickness values are quantized into 64 integer values.

7. The process of claim 1, wherein the directions are equally spaced from each other around the object being modeled.

8. The process of claim 7, wherein for each of the directions, its opposite direction is not included in the group of directions considered, thereby preventing the generation of redundant thickness histograms.

9. The process of claim 8, wherein the prescribed number of directions is chosen to be large enough to ensure that the directional histogram model of an object distinguishes that object from dissimilar objects to an acceptable degree, while at the same time being small enough to allow the directional histogram model to be generated in an acceptable amount of time.

10. The process of claim 9, wherein the prescribed number of directions is 256.

11. The process of claim 1, wherein the object is a 2 dimensional object.

12. The process of claim 1, wherein the object is a 3 dimensional object.

13. A system for generating a directional histogram model of an object from a geometric model of the object, comprising:
   a general purpose computing device comprising a 3D video graphics accelerator; and
   a computer program comprising program modules executable by the computing device, wherein the computing device is directed by the program modules of the computer program to,
      (a) select a previously unselected sampling direction from a set of sampling directions,
      (b) generate an orthogonal projection of the object from the geometric model thereof for the selected sampling direction,
      (c) render an image of the front of the object associated with projection using the graphics accelerator and read the depth value corresponding to each pixel of the object's front,
      (c) render an image of the back of the object associated with projection using the graphics accelerator and read the depth value corresponding to each pixel of the object's back,
      (d) select a previously unselected pair of corresponding pixels of the images of the front and back of the object, (e) compute the distance between the depth values associated with the currently selected pair of corresponding pixels, (f) repeat program modules (d) and (e) for all the remaining previously unselected pairs of corresponding pixels of the object images, (g) normalize the computed distance values, (h) construct a thickness histogram for the selected sampling direction using the normalized distance values, (i) repeat program modules (a) through (h) for all the remaining previously unselected sampling directions, (j) designate the thickness histograms constructed for the selected sampling directions as a directional histogram model of the object.

14. The system of claim 13, further comprising a program module for uniformly quantizing the thickness values after they have been normalized.

15. The system of claim 13, wherein the images of the front and back of the object have a prescribed window size dictating the number of pixels present in the images, and wherein the window size is chosen to be small enough so as to maintain an acceptable rendering speed and depth value lookup, while at the same time large enough to ensure an acceptably accurate thickness distribution.

16. The system of claim 15, wherein the window size is 128 by 128 pixels.

17. The system of claim 13, further comprising, prior to executing the program module for generating an orthogonal projection of the object from the geometric model thereof, executing a program module for simplifying the geometric model of the object to a degree which will simplify the subsequent processing while still resulting in a directional histogram model of an object that distinguishes that object from dissimilar objects to an acceptable degree.

18. A computer-implemented process for measuring the similarity between geometric models of objects using a representation of the objects, comprising using a computer to perform the following process actions:

for each object and a prescribed number of directions,
    determining the thickness of the object along each of a prescribed number of parallel rays directed through the object in the direction under consideration,
    normalizing the determined thickness values,
    generating a thickness histogram from the normalized values;
    normalizing the thickness histogram;
    designating the normalized thickness histograms associated with the prescribed directions as a directional histogram model of the object;
    characterizing the directional histogram model as a number of spherical functions defined on a unit sphere;
    performing a spherical harmonic transform of the characterized histogram model to produce a matrix descriptor which is employed as a representation of the object that is substantially invariant in regard to translation, scaling, and rotation; and
computing a distance measurement between the matrix descriptors of the objects being measured for similarity, wherein the distance measurement is indicative of the degree of difference between the matrix descriptors of the objects.

19. The process of claim 18, further comprising a process action of determining whether an object is similar to one or more other objects, wherein said determining action comprises:

creating a database of objects each of which is characterized as a matrix descriptor;

in putting a geometric model of a sample object and generating a matrix descriptor of the object;

computing a distance measurement between the matrix descriptor of the sample object and each of the matrix descriptors in the database, wherein the distance measurement is indicative of the degree of difference between the matrix descriptors of each compared pair;

identifying objects characterized in the database that are similar to the sample object based on their respective distance measurements; and designating the identified objects as being similar to the sample object.

20. The process of claim 19, wherein the process action of identifying objects characterized in the database that are similar to the sample object, comprises an action of identifying a prescribed number of the objects characterized in the database that are associated with the lowest distance measurements.

21. The process of claim 19 wherein the process action of identifying objects characterized in the database that are similar to the sample object, comprises an action of identifying objects whose associated difference measurement falls below a difference threshold.

22. The process of claim 18, further comprising a process action of determining whether two objects are similar, wherein said determining action comprises:

ascertaining whether the difference measurements computed for the two objects falls below a difference threshold; and whenever the difference measurements fall below said threshold, designating the objects as being similar to each other.

23. The process of claim 18, wherein the process action of computing a distance measurement between the matrix descriptors of the objects being measured for similarity, comprises an action of computing the norm of the difference between the matrix descriptors of each pair of objects being measured.

24. A computer-readable storage medium having computer-executable instructions stored thereon for measuring the similarity between geometric models of objects using directional histogram models of the objects, said computer-executable instructions operable for:

generating a directional histogram model representation of each object from the geometric model of the object, wherein generating the directional histogram model for an object comprises, for each of a prescribed number of directions,
    determining the thickness of the object along each of a prescribed number of parallel rays directed through the object in the direction under consideration,
    normalizing the determined thickness values,
    generating a thickness histogram from the normalized values,
    and wherein the thickness histograms associated with the prescribed directions are designated as the directional histogram model representing the object being modeled; and computing a distance measurement between the directional histogram models of the objects being measured for similarity, wherein the distance measurement is indicative of the degree of difference between the directional histogram models of the objects.

25. The computer-readable medium of claim 24, further comprising an instruction for determining whether two objects are similar, said determining comprising:

ascertaining whether the difference measurements computed for the two objects falls below a difference threshold; and whenever the difference measurements fall below said threshold, designating the objects as being similar to each other.

26. The computer-readable medium of claim 24, further comprising an instruction for determining whether an object is similar to one or more other objects, said determining comprising:

creating a database of objects each of which is characterized as a directional histogram model;

inputting a geometric model of a sample object and generating a directional histogram model of the object;

computing a distance measurement between the directional histogram model of the sample object and each of the directional histogram models in the database, where the distance measurement is indicative of the degree of difference between the directional histogram models of each compared pair;

identifying a prescribed number of the objects characterized in the database that are associated with the lowest distance measurements;

designating the identified objects as being similar to the sample object.

27. The computer-readable medium of claim 24, further comprising an instruction for determining whether an object is similar to one or more other objects, said determining comprising:

creating a database of objects each of which is characterized as a directional histogram model;

inputting a geometric model of a sample object and generating a directional histogram model of the object;

computing a distance measurement between the directional histogram model of the sample object and each of the directional histogram models in the database, where the distance measurement is indicative of the degree of difference between the directional histogram models of each compared pair;

identifying objects characterized in the database whose associated difference measurement falls below a difference threshold;

designating the identified objects as being similar to the sample object.

* * * * *